US012621044B2

(12) United States Patent
Takizawa

(10) Patent No.: US 12,621,044 B2
(45) Date of Patent: May 5, 2026

(54) COMMUNICATION SYSTEM, CONTROL APPARATUS, RELAY STATION, AND COMMUNICATION METHOD

(71) Applicant: TOYOTA JIDOSHA KABUSHIKI KAISHA, Toyota (JP)

(72) Inventor: Kenichi Takizawa, Koganei (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 293 days.

(21) Appl. No.: 18/499,994

(22) Filed: Nov. 1, 2023

(65) Prior Publication Data

US 2024/0146391 A1 May 2, 2024

(30) Foreign Application Priority Data

Nov. 2, 2022 (JP) ................................. 2022-176686

(51) Int. Cl.
*H04B 7/155* (2006.01)
*H04W 52/24* (2009.01)

(52) U.S. Cl.
CPC ...... *H04B 7/15507* (2013.01); *H04W 52/241* (2013.01)

(58) Field of Classification Search
CPC .. H04B 7/15507; H04B 7/15; H04B 7/15528; H04B 7/15542; H04B 7/185; H04B 7/14; H04W 52/241; H04W 52/243; H04W 52/246; H04W 52/248; H04W 52/247; H04W 52/38; H04W 52/18; H04W 52/24
See application file for complete search history.

(56) References Cited

U.S. PATENT DOCUMENTS

2007/0066337 A1 3/2007 Hart
2007/0098102 A1* 5/2007 Hottinen ................. H04L 5/023
375/260

(Continued)

OTHER PUBLICATIONS

Chien, Chun-Che, et al: "Joint Beamforming and Power Allocation for MIMO Relay Broadcast Channel With Individual SINR Constraints", IEEE Transactions on Vehicular Technology, IEEE, USA, vol. 63, No. 4, May 1, 2014 (May 1, 2014), pp. 1660-1677, XP011547728, ISSN: 0018-9545, DOI: 10.1109/TVT.2013. 2285164.

(Continued)

*Primary Examiner* — Keith Ferguson
(74) *Attorney, Agent, or Firm* — Finnegan, Henderson, Farabow, Garrett and Dunner, LLP

(57) ABSTRACT

A communication system includes a first communication station, a second communication station, a relay station to non-regenerative-relay communications between the first communication station and the second communication station, and a control apparatus. The relay station relay-transmits a relay wave with a relay power value of such a limit as to fulfill a second condition when a transmission wave being transmitted from the first communication station and being relay-transmitted by the relay station fulfills a first condition about a signal-to-interference noise power ratio (SINR) and when the relay wave being relay-transmitted by the relay station and reaching the second communication station fulfills the second condition about the signal-to-interference noise power ratio (SINR) and the relay power value in the relay station.

20 Claims, 13 Drawing Sheets

NON-RELAY SIGNALS FROM
TRANSMISSION STATIONS

G1 →
S4-2  S4-3  SINR AT RECEPTION TIME
NOISE LEVEL
FREQUENCY

NON-RELAY SIGNALS FROM
TRANSMISSION STATIONS

ADD TERMINAL
STATION UNDERGOING
NONREGENERATIVE
RELAY

G2 →
SINR AT
RECEPTION
TIME
NOISE LEVEL WHEN
PERFORMING RELAY
S4-2  S4-3  S4-1
RELAY SIGNAL

NOISE LEVEL WHEN NOT
RELAYING
FREQUENCY

NON-RELAY SIGNALS FROM
TRANSMISSION STATIONS

SINR AT
RECEPTION
TIME

PERFORM
POWER
CONTROL

G3 →
S4-2  S4-3  S4-1
RELAY SIGNAL

NOISE LEVEL WHEN
CONTROLLING RELAY
SIGNAL POWER
FREQUENCY

(56)                    References Cited

U.S. PATENT DOCUMENTS

| | | | |
|---|---|---|---|
| 2007/0116106 A1 * | 5/2007 | Hart | ..................... H04W 52/24 |
| | | | 375/227 |
| 2011/0014976 A1 | 1/2011 | Green | |
| 2011/0149769 A1 | 6/2011 | Nagaraja | |
| 2012/0058719 A1 | 3/2012 | Gan et al. | |

OTHER PUBLICATIONS

3rd Generation Partnership Project, 3GPP TS 38.174 V17.0.0, dated Mar. 2022, 317 pgs.
3rd Generation Partnership Project, 3GPP TS 38. 106 V17.0.0, dated Mar. 2022, 77 pgs.
3rd Generation Partnership Project, 3GPP TS 38.174 V17.1.0, dated Jun. 2022, 317 pgs.
3rd Generation Partnership Project, 3GPP TS 38.106 V17.2.0, dated Sep. 2022, 87 pgs.

* cited by examiner

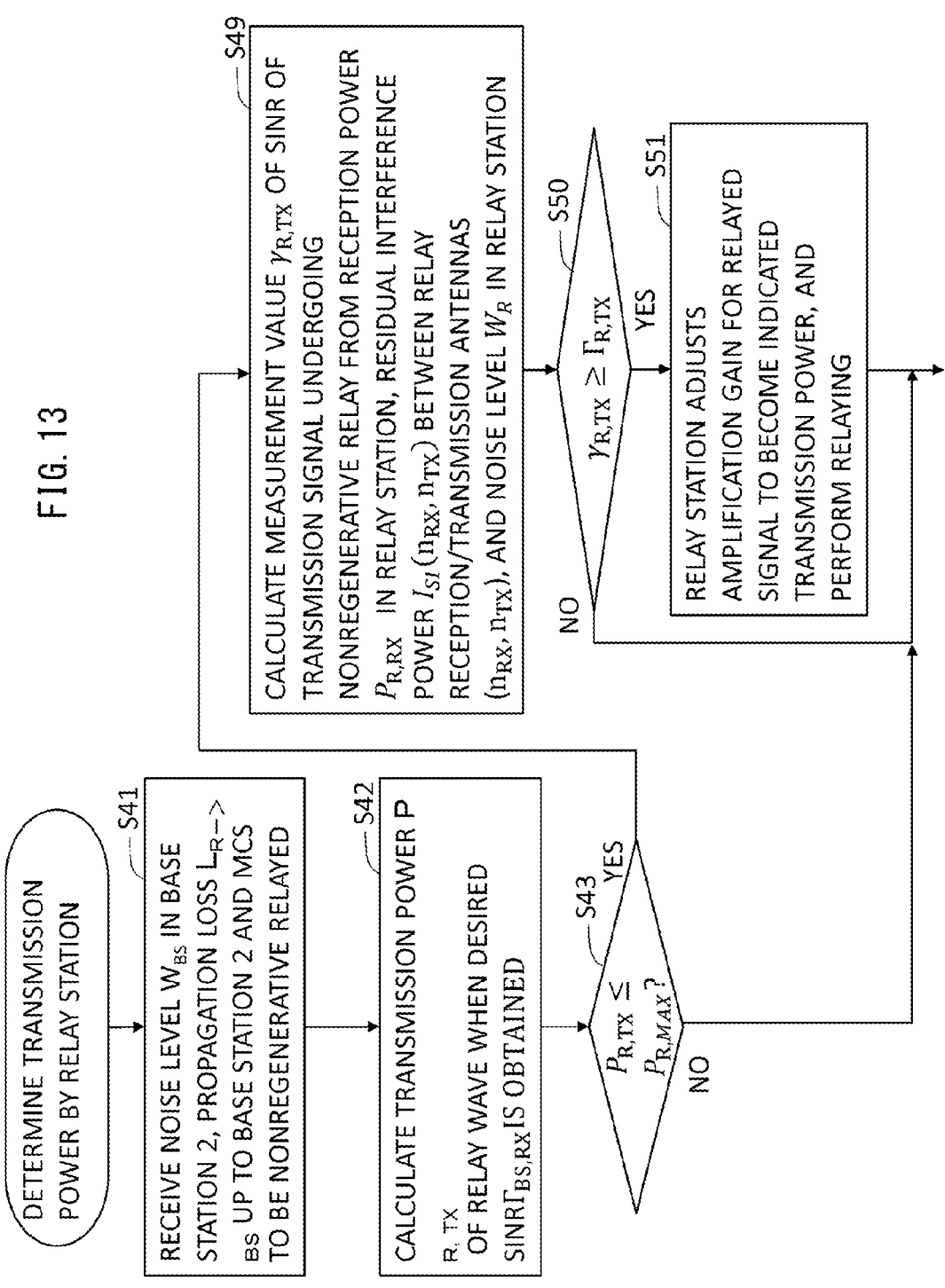

DETERMINE TRANSMISSION POWER BY RELAY STATION

S41 — RECEIVE NOISE LEVEL $W_{BS}$ IN BASE STATION 2, PROPAGATION LOSS $L_{R \rightarrow}$ $_{BS}$ UP TO BASE STATION 2 AND MCS TO BE NONREGENERATIVE RELAYED S42 — CALCULATE TRANSMISSION POWER $P_{R,TX}$ OF RELAY WAVE WHEN DESIRED SINR $\Gamma_{BS,RX}$ IS OBTAINED S43 — $P_{R,TX} \leq P_{R,MAX}$? — YES / NO S49 — CALCULATE MEASUREMENT VALUE $\gamma_{R,TX}$ OF SINR OF TRANSMISSION SIGNAL UNDERGOING NONREGENERATIVE RELAY FROM RECEPTION POWER $P_{R,RX}$ IN RELAY STATION, RESIDUAL INTERFERENCE POWER $I_{SI}(n_{RX}, n_{TX})$ BETWEEN RELAY RECEPTION/TRANSMISSION ANTENNAS $(n_{RX}, n_{TX})$, AND NOISE LEVEL $W_R$ IN RELAY STATION S50 — $\gamma_{R,TX} \geq \Gamma_{R,TX}$ — NO / YES S51 — RELAY STATION ADJUSTS AMPLIFICATION GAIN FOR RELAYED SIGNAL TO BECOME INDICATED TRANSMISSION POWER, AND PERFORM RELAYING

COMMUNICATION SYSTEM, CONTROL APPARATUS, RELAY STATION, AND COMMUNICATION METHOD

CROSS REFERENCE TO THE RELATED APPLICATION

This application claims the benefit of Japanese Patent Application No. 2022-176686, filed on Nov. 2, 2022, which is hereby incorporated by reference herein in its entirety.

BACKGROUND

Technical Field

The present disclosure pertains to a communication system, a control apparatus, a relay station, and a communication method.

Description of the Related Art

Super low delay communications equal to or shorter than sub-milliseconds are expected in wireless communications exemplified by 5th Generation Mobile Communication System (5G) and equivalences. On the other hand, expansions of cell coverage areas are desired in terms of improving communication services, and relay communications via relay stations are effective in attaining the expansions. By the way, non-regenerative relay configured not to demodulate and decode at the relay station is desirable as a relay technology exhibiting a small quantity of delay.

PRIOR ART DOCUMENTS

Non-Patent Documents

[Non-Patent Document 1] 3GPP (registered trademark) TS 38.174 V17.0.0(2022-03)
[Non-Patent Document 2] 3GPP (registered trademark) TS 38.106 V17.0.0(2022-03)

SUMMARY

However, a relay device amplifies not only a relayed signal but also unnecessary signals of noises and interferences inclusive when performing non-regenerative relay. Therefore, e.g., the non-regenerative-relay on an uplink has a possibility of deteriorating a signal-to-interference noise power ratio (SINR) of a reception signal for other terminals excluding a relay target terminal when a base station as a reception station receives the signal. Note that the non-regenerative-relay on a downlink also has the possibility of deteriorating the SINR of the non-regenerative-relayed signal among plural terminals. An aspect of an embodiment of the disclosure resides in performing the non-regenerative-relay in a way that suppresses the deterioration of the SINR of the reception signal.

One aspect of the embodiment of the disclosure is exemplified by a communication system. The communication system includes a first communication station, a second communication station, a relay station to non-regenerative-relay communications between the first communication station and the second communication station, and a control apparatus. The relay station relay-transmits a relay wave with a relay power value of such a limit as to fulfill a second condition when a transmission wave being transmitted from the first communication station and being relay-transmitted by the relay station fulfills a first condition about a signal-to-interference noise power ratio (SINR) and when the relay wave being relay-transmitted by the relay station and reaching the second communication station fulfills the second condition about the signal-to-interference noise power ratio (SINR) and the relay power value in the relay station.

The communication system is enabled to perform the non-regenerative-relay in a way that suppresses the deterioration of the SINR of the reception signal.

BRIEF DESCRIPTION OF THE DRAWINGS

FIG. 1 is a diagram illustrating a communication system according to a first embodiment;
FIG. 5 is a diagram illustrating a profile of reception signal power at a base station operating as a second communication station (reception station) when the communication system controls relay power in a relay station;
FIG. 10 is a diagram illustrating a profile of the reception signal power in the base station as a second communication station (reception station) when the communication system according to a third embodiment controls transmission signal power in the relay station;
FIG. 13 is a flowchart illustrating a processing flow of the relay station according to a fourth embodiment.

DESCRIPTION OF THE EMBODIMENTS

Figure 2:
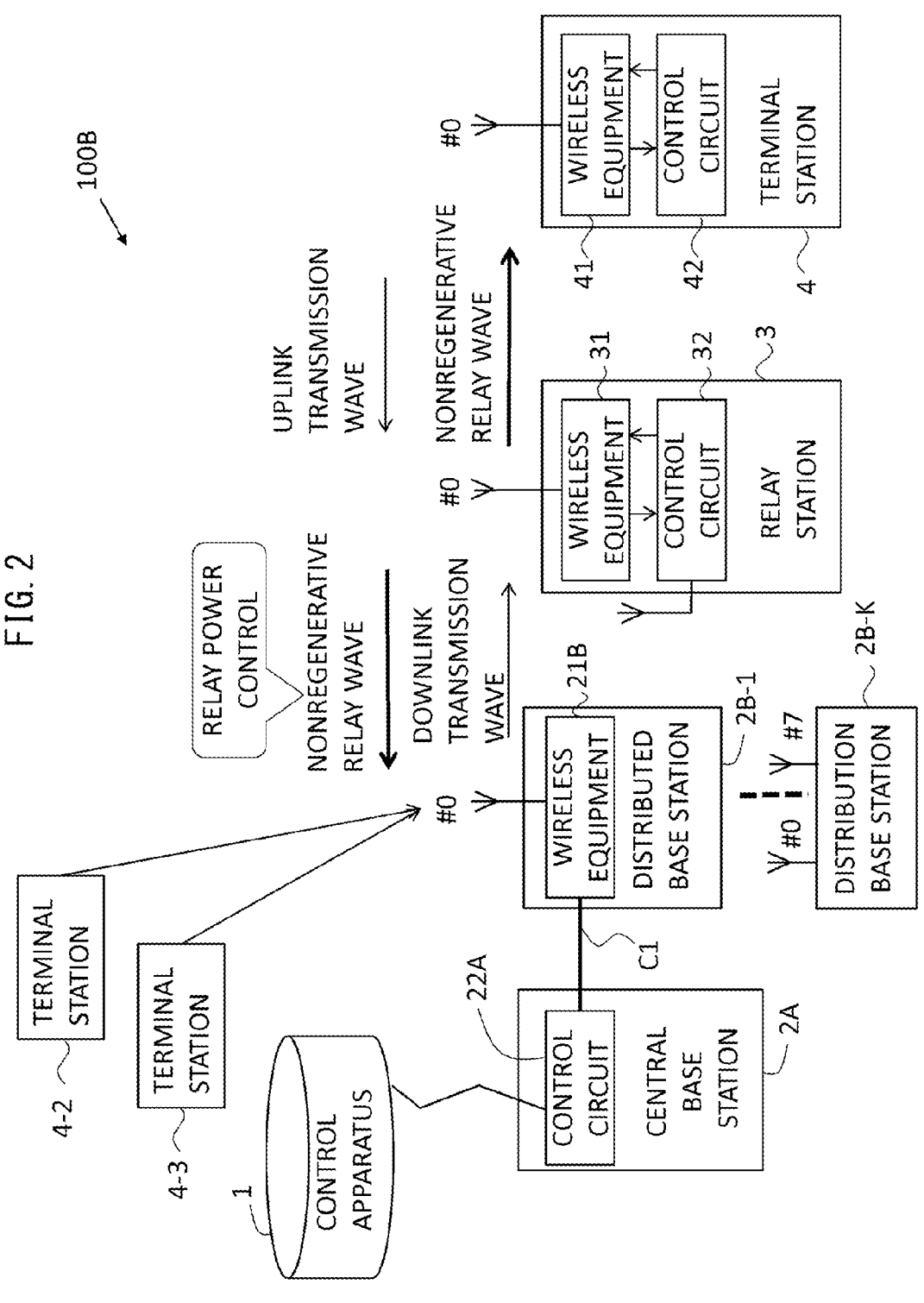
FIG. 2 is a diagram illustrating another communication system embraced by the first embodiment.

A communication system 100, a control apparatus 1, a relay station 3, and a communication method will hereinafter be described with reference to the drawings. The communication system 100 includes a first communication station, a second communication station, a relay station to non-regenerative-relay communications between the first communication station and the second communication station, and a control apparatus. The communication system determines whether a transmission wave transmitted from the first communication station and relay-transmitted by the relay station fulfills a first condition with respect to a signal-to-interference noise power ratio (SINR). The communication system determines whether a relay wave relay-transmitted by the relay station and reaching the second communication station fulfills a second condition with respect to the signal-to-interference noise power ratio (SINR) and a relay power value in the relay station. When the first condition is fulfilled and when the second condition is fulfilled, the relay station transmits the relay wave with such a relay power value as to be within a limit of fulfilling the second condition.

Herein, the first communication station may be said to be a transmission station. The second communication station may be said to be a reception station. For example, on an uplink, the first communication station is a terminal station 4, while the second communication station is a base station 2. On a downlink, the first communication station is the base station 2, while the second communication station is the terminal station 4.

The first condition is that the signal-to-interference noise power ratio (SINR) given when the relay station 3 relay-transmits the transmission wave being transmitted by the first communication station satisfies a first reference value. The first reference value is a value given by adding a margin to a desired SINR "$T_{R,TX}$" desired for a modulation method and a coding rate (MCS) used in the relay station 3 for communications. Note that the margin includes a case of zero (0) margin, i.e., the case of having no margin. The second condition pertains to a relay power value for transmitting the relay wave when the signal-to-interference noise power ratio (SINR), at which the second communication station receives the relay wave being relay-transmitted by the relay station 3, satisfies the second reference value. The second condition is that the relay power value is within a range of being equal to or lower than an allowable transmission power "$P_{R,MAX}$" in the relay station 3. Herein, the relay transmission means being relay-processed and transmitted by the relay station 3.

The second reference value is a value given by adding the margin to the desired SINR "$T_{BS,RX}$" in the second communication station, e.g., the base station 2 using the modulation method and the coding rate (MCS) for the communications. Note that a desired SINR in the relay station 3 is an SINR reflecting a difference ($M_{BS}=W_{BS}-W_R$) between a noise level "$W_{BS}$" in the base station 2 and a noise (and interference signal) level "$W_R$" in the relay station 3. For example, when the noise (and interference signal) level in the base station 2 is higher by the difference value "$M_{BS}$" than the noise (and interference signal) level in the relay station 3, the desired SINR "$T_{BS,RX}$" is set to "$T_{R,T}+M_{BS}$" that is a value given by adding the difference value "$M_{BS}$" to the desired SINR "$T_{R,T}$".

It thereby follows that the reference values are fulfilled, which are given by adding the margins to the desired SINRs in connection with the modulation methods and the coding rates (MCS) used for the communications, in both of the relay station 3 and the second communication station (e.g., the base station 2). Therefore, in the communication system 100, the first condition and the second condition are fulfilled, whereby the relay station 3 relay-transmits the relay wave with the relay power value within such a limit that the reception signal in the second communication station fulfills the value given by adding the margin to the desired SINR. The communication system 100 is thereby enabled to suppress an increase in noise level, which is caused concurrently with the relay.

First Embodiment (System Configuration)

Figure 1:
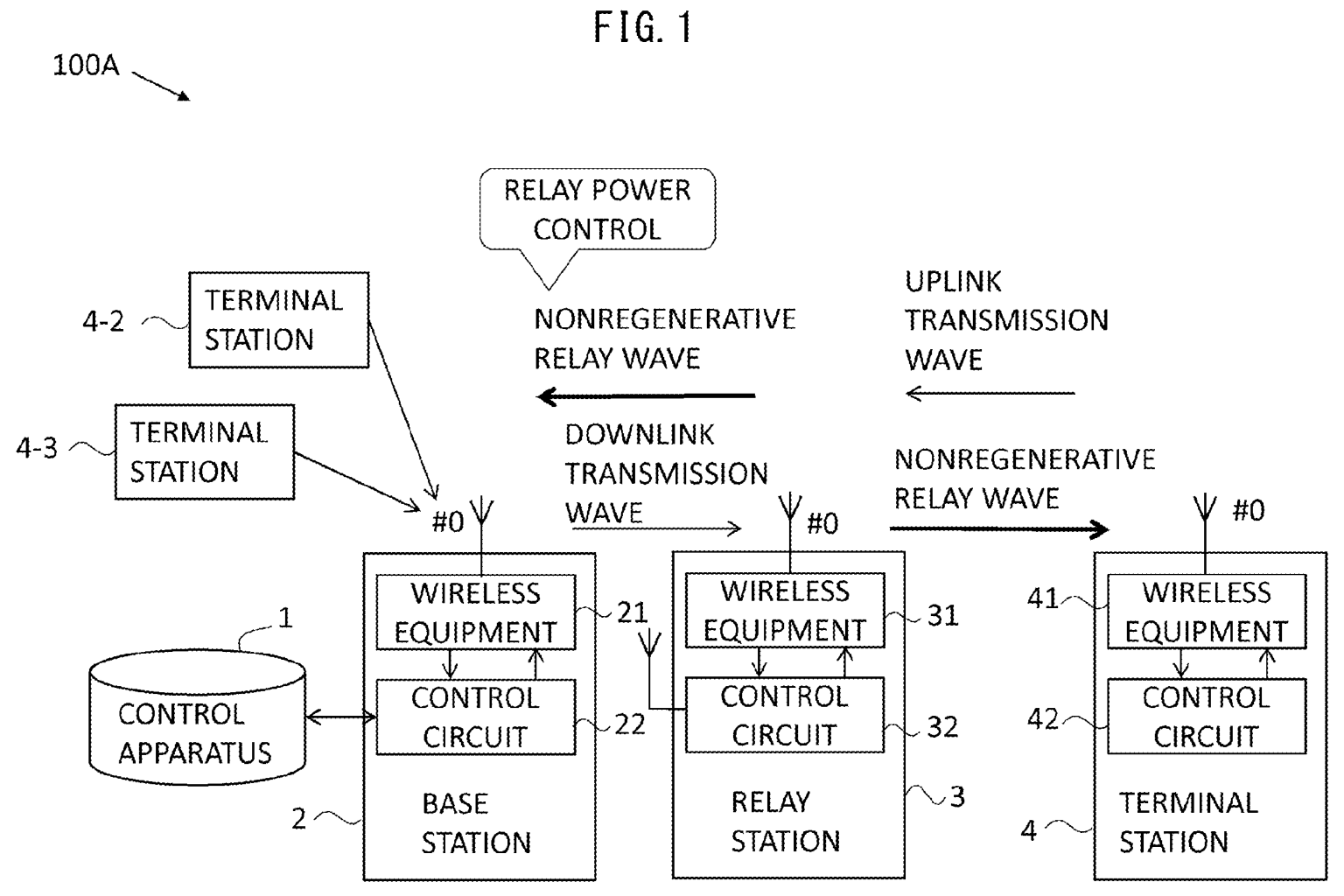

FIG. 1 is a diagram illustrating a communication system 100A according to a first embodiment. The communication system 100A includes a control apparatus 1, a base station 2, a relay station 3, and a terminal station 4. The control apparatus 1 is an apparatus on a core network to which the base station 2 is connected. The control apparatus 1 may also be, however, considered to be the core network itself or a system included by the core network. The core network includes, e.g., an optical fiber network. The control apparatus 1 controls the base station 2, the relay station 3 and the terminal station 4, thereby providing communication services to the terminal station 4. However, the control apparatus 1 may be included in the base station 2. In other words, when a plurality of base stations 2 exists, each base station 2 may be provided with the control apparatus 1.

The base station 2 provides a wireless access network to the terminal station 4. An area enabling wireless communications in the wireless access network is also called a cell. The base station 2 includes one or more antennas (denoted by, e.g., #0), wireless equipment 21 connected to the one or more antennas, and a control circuit 22. The control circuit 22 includes, e.g., a processor and a memory. The processor controls, based on a computer program on the memory, the communications with the control apparatus 1 and wireless communications with the relay station 3 and the terminal station 4.

The terminal station 4 is also called a mobile station. The mobile station connects to the wireless access network within a range of the cell provided by the base station 2. On the other hand, the relay station 3 relays the wireless communications between the base station 2 and the terminal station 4. The relay station 3 may include a station called a fixed station with its installed location being fixed and the mobile station.

The relay station 3 includes, as in the case of the base station 2, the one or more antennas (e.g., #0), wireless equipment 31 connected respectively to the one or more antennas, and a control circuit 32. Note that the control circuit 32 is connected to an antenna dedicated to the control circuit 32 independently of the antennas connected to the wireless equipment 31 as the case may be. The relay station 3 performs the non-regenerative relay in the communications between the terminal station 4 and the base station 2. The non-regenerative relay does not involve demodulating and decoding the relayed signal. Hence, the communications are non-regenerative-relayed with a time delay within a range that does not change the timeslot in the communications based on Time Division Multiplexing.

The terminal station 4 includes the one or more antennas (e.g., #0), wireless equipment 41 connected respectively to the one or more antennas, and a control circuit 42. However, the single wireless equipment 41 may also be mounted with a plurality of antennas. For example, the wireless equipment 41 may simply receive reception signals by selecting the antenna exhibiting a highest level of the reception signal. Similarly, the single wireless equipment 31 in the relay station 3 may also be mounted with the plurality of antennas. The mobile station existing in the cell requests the base station 2 to connect with the wireless access network and is thereby connected to the network, whereby the mobile station operates as the terminal station 4. The in-cell mobile station may request the base station 2 to connect directly with the wireless access network. The mobile station may request the base station 2 to connect with the wireless access network via the mobile station operating as the relay station 3 in the cell or via the fixed station outside or within the cell. The terminal station 4 may be said to be a station enabled to communicate with the base station 2 via any of the one or more relay stations 3 or without via any of the one or more relay stations 3. In a downlink channel, the first communication station may be said to be the base station 2, while the second communication station may be said to be the terminal station 4. In an uplink channel, the first communication station may be said to be the terminal station 4, while the second communication station may be said to be the base station 2.

FIG. 2 is a diagram illustrating a communication system 100B given as another example included in the embodiment. In comparison with the communication system 100A in FIG. 1, the communication system 100B includes a central base station 2A and one or more distribution base stations 2B in place of the base station 2. The one or more distribution base stations 2B are, when individually distinguished, denoted by branch numbers such as the distribution base stations 2B-1, . . . , 2B-K. Herein, the branch number K is an integer indicating the number of the distribution base stations. FIG. 2 illustrates the distribution base stations 2B-1 and 2B-K. However, the distribution base stations 2B-1, . . . , 2B-K are, when generically named, simply termed the distribution base stations 2B.

The central base station 2A includes a control circuit 22A. The distribution base station 2B includes a wireless equipment 21B. The control circuit 22A of the central base station 2A is connected via, e.g., an optical fiber C1 or the wireless network to the wireless equipment 21B of the distribution base station 2B. A network topology of the optical fibers C1 connecting the central base station 2A to the plurality of distribution base stations 2B, is not limited. For instance, the network topology of the optical fibers C1 may be a point-to-point topology between nodes, a network topology in which the nodes are further distributed as getting farther from the central base station 2A, a star network topology, or a ring network topology. Limited are none of standards and protocols of the wireless networks when the control circuit 22A of the central base station 2A is connected via the wireless network to the wireless equipment 21B of the distribution base station 2B.

The control circuit 22A includes the processor and the memory as in the case of the control circuit 22 in FIG. 1. The processor controls, based on the computer program on the memory, the communications with the control apparatus 1 and the wireless communications with the relay stations 3 and the terminal station 4. To be specific, the control circuit 22A controls the wireless communications with the relay stations 3 and the terminal station 4 via the wireless equipment 21B of the one or more distribution base stations 2B. In the downlink channel, the first communication stations may be said to be the central base station 2A and the distributed base station 2B, while the second communication station may be said to be the terminal station 4. In the uplink channel, the first communication station may be said to be the terminal station 4, while the second communication stations may be said to be the central base station 2A and the distributed base station 2B.

Note that the communication systems 100A and 100B are, when generically termed, simply called the communication systems 100. In FIGS. 1 and 2, the control apparatus 1 and the base station 2 are illustrated as different apparatuses. As described above, however, the control apparatus 1 may be included in the control circuit 22 of the base station 2 or in the control circuit 22A (of the central base station 2A) in the first and subsequent embodiments. When the control apparatus 1 is included in the control circuit 22 of the base station 2 or in the control circuit 22A (of the central base station 2A), processes and a configuration of the control apparatus 1 may therefore be said to be processes and a configuration of the base station 2 in the first and subsequent embodiments.

Figure 3:
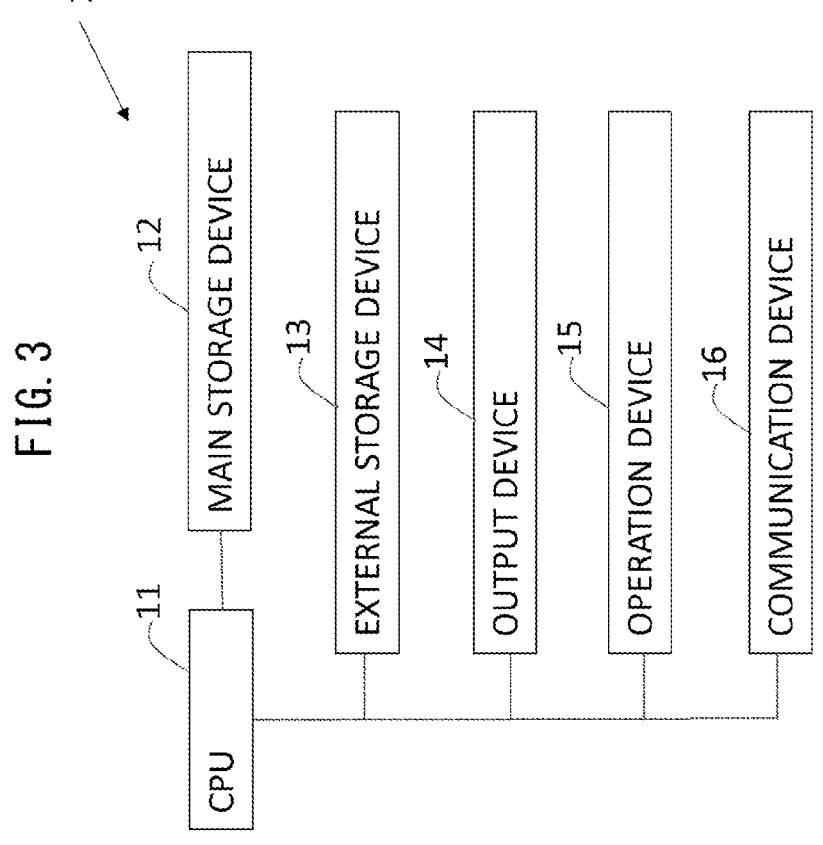
FIG. 3 is a diagram illustrating a hardware configuration of a control apparatus.

FIG. 3 is a diagram illustrating a hardware configuration of the control apparatus 1. The control apparatus 1 includes a CPU 11, a main storage device 12 and external equipment, and executes communication processes and information processes, based on computer programs. The CPU 11 is also called a processor. The CPU 11 may also take a multi-processor configuration without being limited to a single processor. The CPU 11 may also be configured to include a Graphics Processing Unit (GPU), a Digital Signal Processor (DSP) and other equivalents. The CPU 11 may further be configured to cooperate with a hardware circuit exemplified by a Field Programmable Gate Array (FPGA). The external equipment is exemplified by an external storage device 13, an output device 14, an operation device 15, and a communication device 16.

The CPU 11 executes the computer program deployed in an executable manner on the main storage device 12, and thus provides processes of the control apparatus 1. The main storage device 12 stores the computer programs to be executed by the CPU 11 and data to be processed by the CPU 11. The main storage device 12 is exemplified by a Dynamic Random Access Memory (DRAM), a Static Random Access Memory (SRAM), and a Read Only Memory (ROM). The external storage device 13 is used as, e.g., a storage area auxiliary to the main storage device 12 to thereby store the computer programs to be executed by the CPU 11 and the data to be processed by the CPU 11. The external storage device 13 is exemplified by a Hard Disc Drive (HDD) and a Solid State Drive (SSD). The drive device serving as an attachable/detachable storage medium may be connected to the control apparatus 1. The attachable/detachable storage medium is exemplified by a Blu-ray disc, a Digital Versatile Disc (DVD), a Compact Disc (CD), and a flash memory card.

The output device 14 is a display device exemplified by a liquid crystal display, and an electroluminescence panel. The output device 14 may, however, include a loudspeaker and other devices that output voices and sounds. The operation device 15 is exemplified by a touch panel built up by superposing a touch sensor on the display device. The communication device 16 performs the communications with the base station 2 and an external network exemplified by the Internet via the optical fiber. The communication device 16 is, e.g., a gateway connected to the base station 2 and a gateway for the communications with the external network exemplified by the Internet. The communication device 16 may be configured as a single device and may also be configured by combining a plurality of devices.

Control of Signal Power

Figure 4:
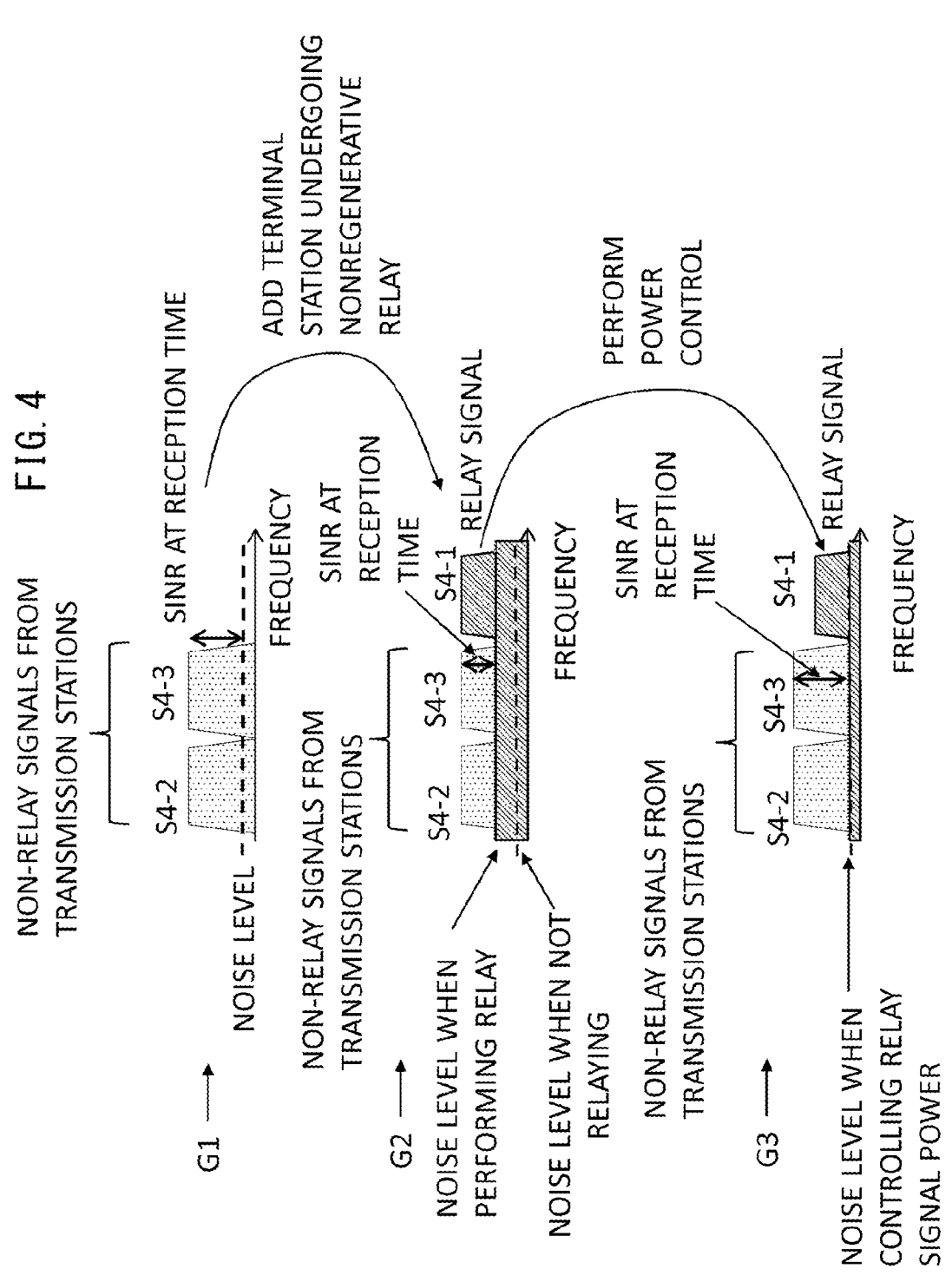
FIG. 4 is a diagram illustrating power of reception signals at a second communication station (reception station), the reception signals being transmitted from respective transmission stations in communications by the communication system.

FIG. 4 is a diagram illustrating power of reception signals, which are transmitted from respective transmission stations, e.g., the terminal stations 4, in the second communication station, e.g., the base station 2 in the communications by the communication system 100. In the communication system 100, when the relay station 3 performs the non-regenerative relay, not only the relayed signals but also signals containing unnecessary signals such as noises (including interference) are amplified. Consequently, for instance, the non-regenerative relay on the uplink might deteriorate the SINRs of the reception signals for other terminal stations 4 excluding the terminal station 4 transmitting the signal to be relayed when receiving the signals in the base station 2. For example in FIG. 1, when the relay station 3 non-regenerative-relays the transmission signal from the terminal station 4-1, the SINRs of the reception signals might be deteriorated for other terminal stations 4-2, 4-3. FIG. 4 illustrates a problem incidental to the non-regenerative relay and a solution by referring to the signals on the uplink.

FIG. 4 illustrates three partial graphs G1 though G3. In each of waveforms of G1-G3, the axis of abscissa indicates a frequency. The graphs G1-G3 of FIG. 4 indicate magnitudes of reception signal power of signals S4-1, S4-2, S4-3 transmitted from the respective transmission stations, e.g., the terminal stations 4-1, 4-2, 4-3 and received by the base station 2 as the reception station. However, the signals S4-2, S4-3 are the signals not to be relayed, while the signals S4-1 is the reception signal having the relay wave that is non-regenerative-relayed by the relay station 3. Hence, in FIG. 4, the graph G1 illustrates the reception signals not to be relayed by the relay station 3, which come from the respective terminal stations 4 as the first communication stations (transmission stations) and are received by the base station 2 as the second communication station (reception station), and a noise level indicated by a dotted line.

The graph G2 illustrates an addition of the signal S4-1 having the relay wave, which is relayed by the relay station 3 and received by the base station 2. In the graph G2, the noise level rises above the noise level (dotted line) given when not performing the relay. In other words, the non-regenerative relay involves relaying the noise and the interference signal other than the relayed signal, whereby the noise level increases in the base station 2. Consequently, the SINRs of the reception signals, which are exclusive of the relay wave and come from the terminal stations 4-2, 4-3, gets deteriorated when received by the base station 2.

The graph G3 illustrates the reception signal level in the base station 2 when the transmission power for transmitting the relay wave in the relay station 3 is decreased down to a possible limit. In other words, it is feasible to restrain the SINRs of the reception signals excluding the relay wave and coming from the terminal stations 4-2, 4-3 from being deteriorated when received by the base station 2 by decreasing the transmission power of the relay wave in the relay station 3. However, the relay station 3 is required to decrease the transmission power of the relay wave down to the possible limit. In the first and subsequent embodiments, a value of the transmission power of the relay wave is referred to as a relay power value.

In a plain word, the control apparatus 1 according to the first embodiment controls the power in the non-regenerative relay on, e.g., the uplink. For instance, the control apparatus 1 calculates the relay power value equal to or lower than an upper limit value of the transmission power from the noise level in the base station 2 and from a desired SINR of the MCS in the communications to be non-regenerative-relayed, and indicates the calculated relay power value to the relay station 3. The relay station 3 thereby reduces degrees of how much the noises and the interferences affect the terminal stations 4-2, 4-3 other than the non-regenerative-relay target terminal station 4-1 due to introduction of the non-regenerative relay. In other words, the communication system 100 is enabled to improve throughput of the whole communication system 100.

Figure 5:
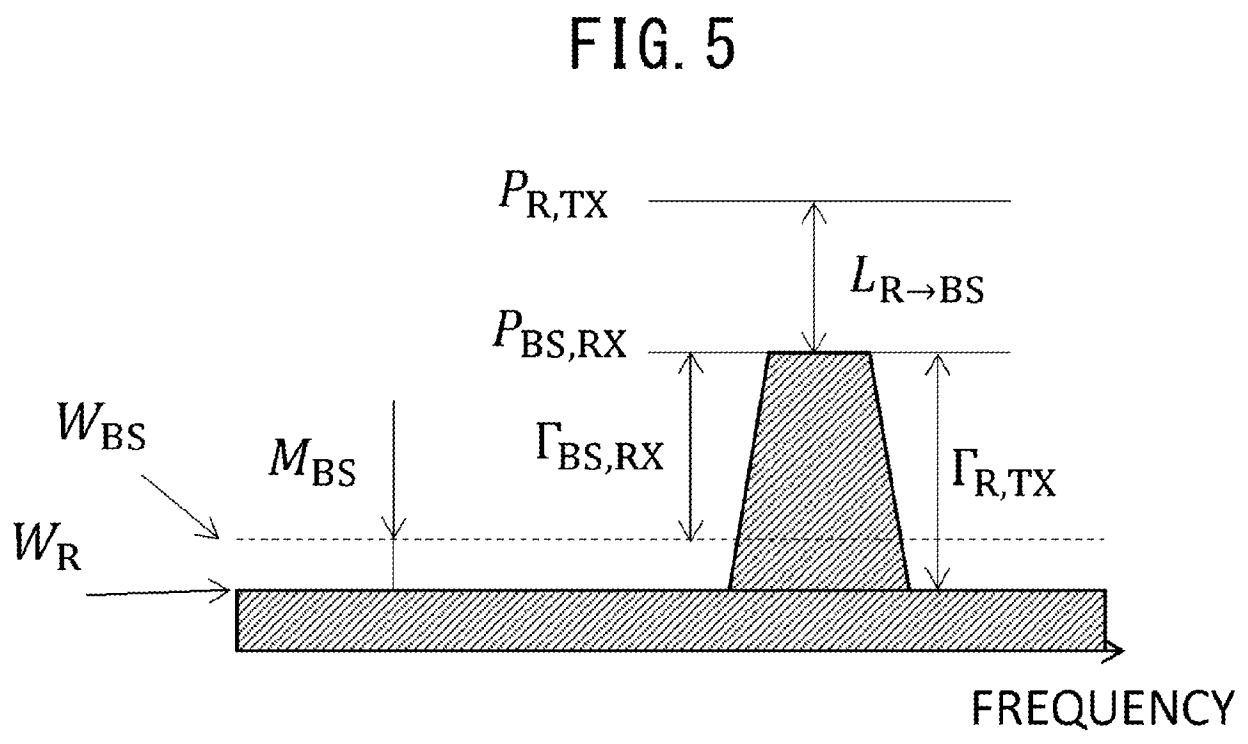

FIG. 5 is a diagram illustrating a profile of the reception signal power in the second communication station (reception station) when the communication system 100 controls the relay power in the relay station 3. A waveform in FIG. 5 is the profile of the reception signal power in the second communication station (reception station). In FIG. 5, the axis of abscissa indicates the frequency. Herein, communication procedures are outlined, in which the terminal station 4 operates as the transmission station (the first communication station), while the base station 2 operates as the reception station (the second communication station).

To begin with, the control apparatus 1 is to be given a noise level "$W_{BS}$" and a desired SINR "$\Gamma_{BS,RX}$" of the non-regenerative relay signal in the base station 2 serving as the second communication station (reception station). However, the control apparatus 1 may cause the base station 2 to measure the noise level "$W_{BS}$". The control apparatus 1 measures a propagation loss "$L_{R\to BS}$", between the relay station 3 and the base station 2, of a reference signal on a control channel, which is transmitted from the relay station 3. The control apparatus 1 calculates the transmission power "$P_{R,TX}$" in the relay station 3 and an SINR "$\Gamma_{R,TX}$" given when transmitting the relay signal as a relay feasibility condition from the noise level "$W_{BS}$", the desired SINR "$\Gamma_{BS,RX}$" and the propagation loss "$L_{R\to BS}$" in the base station 2. Herein, the SINR "$\Gamma_{BS,RX}$" may be a desired SINR of the communication method (MCS) used in the communications and may also be a value given by adding a margin to the desired SINR.

The transmission power "$P_{R,TX}$" of the relay wave in the relay station 3 is calculated by (Formula 1) given below.

$$P_{R,TX}=P_{BS,RX}+L_{R\to BS}=W_{BS}+\Gamma_{BS,RX}+L_{R\to BS} \qquad \text{(Formula 1)}$$

Namely, (Formula 1) signifies that the desired SINR "$\Gamma_{BS,RX}$" in the base station 2 is fulfilled even when the transmission power "$P_{R,TX}$" is deteriorated to a degree corresponding to the noise level "$W_{BS}$" in the base station 2 and the propagation loss "$L_{R\to BS}$" of the propagation to the base station 2 from the relay station 3.

The desired SINR "$\Gamma_{R,TX}$" given in the transmission in the relay station 3 is calculated by (Formula 2) as follows:

$$\Gamma_{BS,RX}=\Gamma_{R,TX}-M_{BS} \qquad \text{(Formula 2)}$$

Herein, "$M_{BS}$" is a difference value of the noise level "$W_{BS}$" in the base station 2 against the noise level "$W_R$" in the relay station 3. Namely, the noise level "$W_{BS}$" is given by $W_{BS}=W_R+M_{BS}$. Accordingly, (Formula 2) indicates that the desired SINR "$\Gamma_{R,TX}$" given when transmitting the relay signal is approximately calculatable by adding the difference value "$M_{BS}$" to the desired SINR "$\Gamma_{BS,RX}$" of the non-regenerative relay signal in the base station 2.

When the transmission power "$P_{R,TX}$" of the relay wave in the relay station 3 is equal to or lower than an allowable transmission power "$P_{R,MAX}$" of the relay station 3, the control apparatus 1 notifies the transmission power "$P_{R,TX}$" and the SINR "$\Gamma_{R,TX}$" to the relay station 3. The relay station 3 calculates a measurement value "$\gamma_{R,TX}$" of the SINR of the transmission signal to undergo the non-regenerative relay by (Formula 3).

(Mathematical Equation 1)

$$\gamma_{R,TX} = P_{R,RX} - 10\log_{10}\left(10^{\frac{I_{SI}(n_{RX},n_{TX})}{10}} + 10^{\frac{W_R}{10}}\right) \qquad \text{(Formula 3)}$$

Herein, "$P_{R,RX}$" is reception power given when the relay station 3 receives the transmission signal transmitted by the terminal station 4. "$I_{SI(nRX,nTX)}$" stands for residual interference power between relay reception/transmission antennas "$n_{RX},n_{TX}$" (which are, however, omitted in FIG. 5). "$W_R$" denotes the noise level in the relay station 3. "$\gamma_{R,TX}$" is equal to or larger than "$\Gamma_{R,TX}$", in which case the relay station 3 adjusts an amplification gain for the relayed signal to become the transmission power "$P_{R,TX}$" indicated by the control apparatus 1, thus performing the relay. "$\gamma_{R,TX}$" may

9 be said to be the signal-to-interference noise power ratio (SINR) given when the relay station 3 relay-transmits the transmission wave to be transmitted by the terminal station 4 as the first communication station (transmission station). Note that values in respective terms in (Formula 3) are calculated as decibel values, and hence the SINR is calculated as a difference. When the measurement value "$\gamma_{R,TX}$" is equal to or larger than the SINR "$T_{R,TX}$" given at the transmission time in the relay station 3, the relay station 3 is enabled to determine that the desired SINR of the communication method used for the communications is satisfied.

Processing Flow

Figure 6:
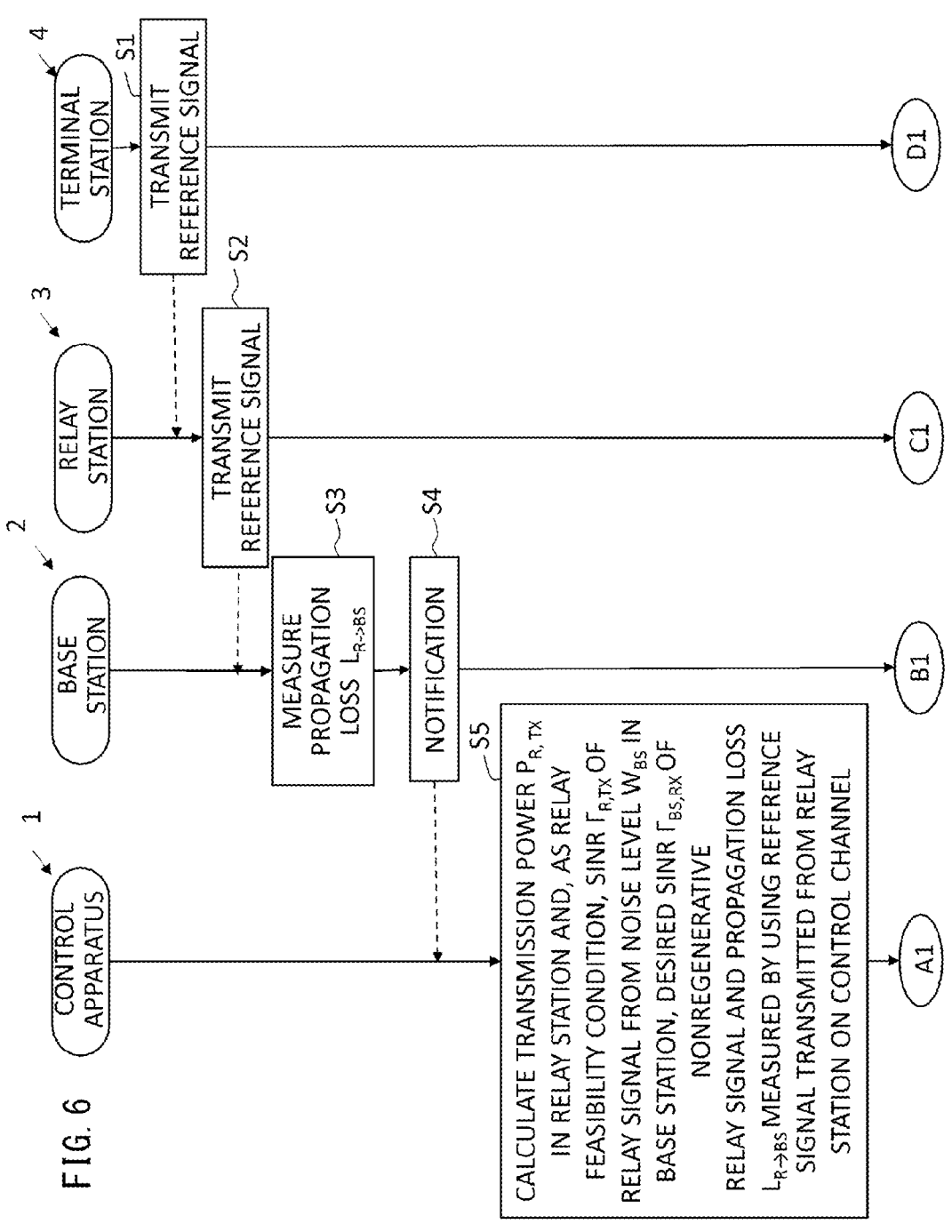
FIG. 6 is a flowchart illustrating a processing flow in the communication system according to the first embodiment.
Figure 7:
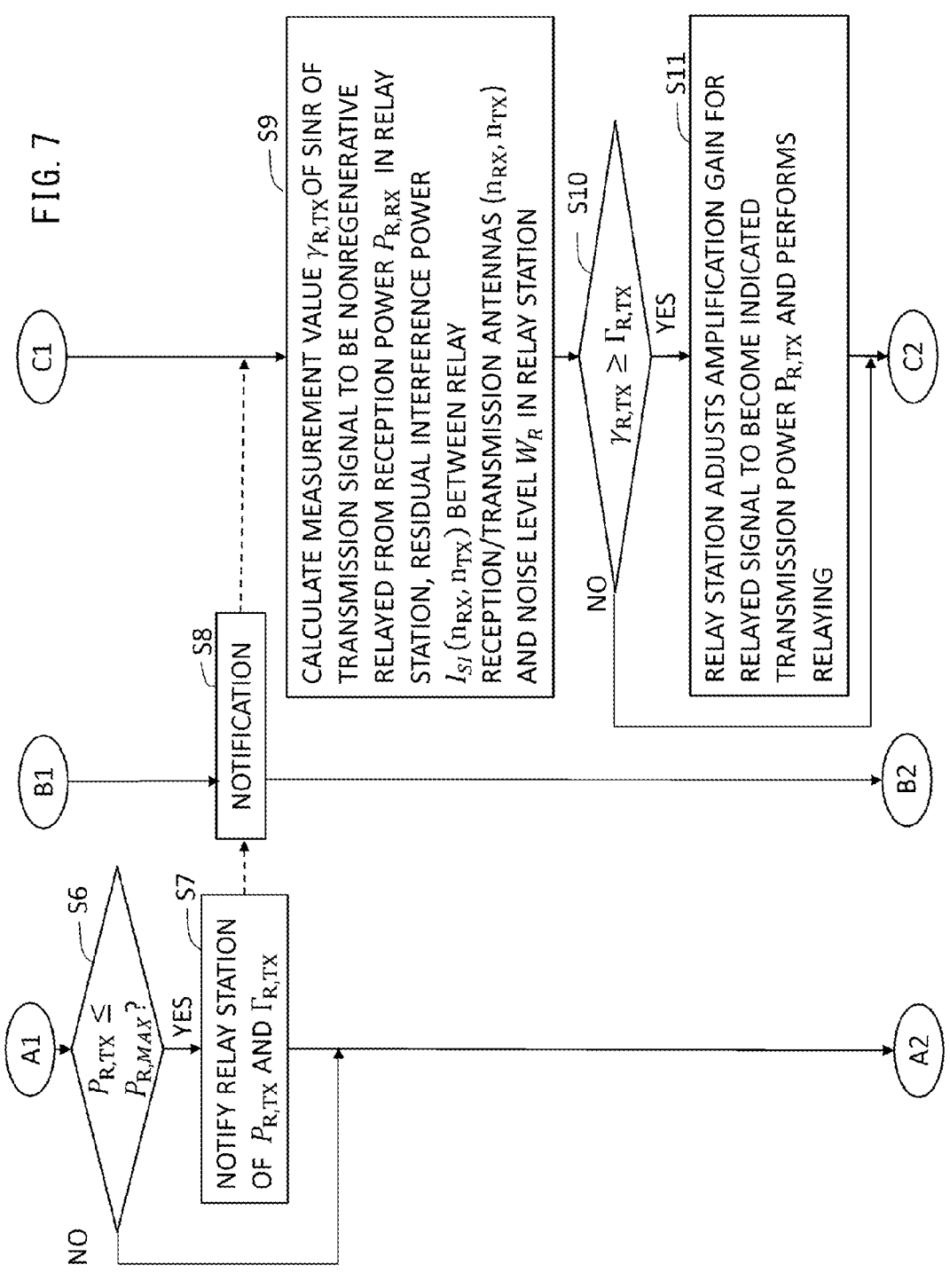
FIG. 7 is a flowchart illustrating the processing flow in the communication system according to the first embodiment.

FIGS. 6 and 7 illustrate a processing flow in the communication system 100 according to the first embodiment. Note that the control apparatus 1 may be, as described above, included in the control circuit 22 of the base station 2 or the control circuit 22A (of the central base station 2A) in the first and subsequent embodiment. Accordingly, in processes of FIGS. 6 and 7, the processes of the control apparatus 1 and the processes of the base station 2 are depicted in different sequences but may also be integrated into a single sequence. The processing flow in FIGS. 6 and 7 is repeated for every wireless frame. Herein, the processing flow on the uplink will be described on the assumption that the terminal station 4 operates as the transmission station (the first communication station), and the base station 2 operates as the reception station (the second communication station). To start with, the terminal station 4 and the relay station 3 transmit the reference signals on the uplink control channel to the base station 2 (S1, S2).

The base station 2, which receives the reference signal on the control channel from the relay station 3, measures a propagation loss "$L_{R\rightarrow BS}$" (S3), and notifies the measured propagation loss to the control apparatus 1 (S4). As described in FIG. 5, the control apparatus 1 is given the noise level "$W_{BS}$" in the base station 2 and the desired SINR "$T_{BS,RX}$" of the non-regenerative relay signal. The control apparatus 1 measures the propagation loss "$L_{R\rightarrow BS}$" by using the reference signal transmitted on the control channel from the relay station 3. The control apparatus 1 calculates the transmission power "$P_{R,TX}$" in the relay station 3 and, as the relay feasibility condition, the desired SINR "$T_{R,TX}$" given when transmitting the relay signal from the noise level "$W_{BS}$" in the base station 2, the desired SINR "$T_{BS,RX}$" of the non-regenerative relay signal and the propagation loss "$L_{R\rightarrow BS}$" (S5).

For instance, the transmission power "$P_{R,TX}$" in the relay station 3 is calculated in (Formula 1). The transmission power "$P_{R,TX}$" is one example of the relay power value for transmitting the relay wave in a case where the signal-to-interference noise power ratio (SINR) given when the base station 2 as the second communication station receives the relay wave being relay-transmitted by the relay station 3 satisfies the second reference value. The desired SINR "$T_{BS,RX}$" of the non-regenerative relay signal may be said to be one example of the second reference value. The SINR "$T_{R,TX}$" given when transmitting the relay signal is approximately calculated in (Formula 2) described above. FIG. 6 continues via A1, B1, C1, D1 to FIG. 7.

The description will hereinafter continue with reference to FIG. 7.

Next, the control apparatus 1 determines whether the transmission power "$P_{R,TX}$" in the relay station 3 is equal to or lower than the allowable transmission power "$P_{R,MAX}$" in the relay station 3 (S6). When the transmission power "$P_{R,}$

10

$TX$" in the relay station 3 exceeds the allowable transmission power "$P_{R,MAX}$" in the relay station 3 (NO in S6), the control apparatus 1 finishes processing in the wireless frame. Whereas when the transmission power "$P_{R,TX}$" in the relay station 3 is equal to or lower than the allowable transmission power "$P_{R,MAX}$" in the relay station 3 (YES in S6), the control apparatus 1 notifies the transmission power "$P_{R,TX}$" and the SINR "$T_{R,TX}$" to the relay station 3 via the base station 2 (S7, S8).

The determination in S6 is made for the relay power value for transmitting the relay wave in the case where the signal-to-interference noise power ratio (SINR) given when the base station 2 as the second communication station receives the relay wave being relay-transmitted by the relay station 3 satisfies the second reference value. In other words, the determination in S6 is made for ensuring that the relay power value is within a range of the allowable transmission power "$P_{R,MAX}$" in the relay station 3.

The relay station 3 calculates a measurement value "$\gamma_{R,TX}$" of the SINR of the transmission signal to be non-regenerative-relayed from the reception power "$P_{R,RX}$" in the relay station 3, the residual interference power "$I_{SI(nRX,nTX)}$" between the relay reception/transmission antennas "$n_{RX},n_{TX}$", and the noise level "$W_R$" in the relay station 3 (S9). As described above, the measurement value "$\gamma_{R,TX}$" is calculated in accordance with (Formula 3) described above.

The relay station 3 determines whether the measurement value "$\gamma_{R,TX}$" of the SINR of the transmission signal to be non-regenerative-relayed is equal to or larger than the desired SINR "$T_{R,TX}$" (S10). When the measurement value "$\gamma_{R,TX}$" of the SINR is less than the SINR "$T_{R,TX}$" (NO in S10), the relay station 3 finishes processing in the wireless frame. Whereas when the measurement value "$\gamma_{R,TX}$" of the SINR of the transmission signal is equal to or larger than the SINR "$T_{R,TX}$" (YES in S10), the relay station 3 adjusts the amplification gain for the relayed signal to become the notified transmission power "$P_{R,TX}$", and thus performs the relay (S11).

The determination in S10 is one example of determining whether the transmission wave to be transmitted by the terminal station 4 as the first communication station (transmission station) and relay-transmitted by the relay station 3 fulfills a first condition with respect to the signal-to-interference noise power ratio "$\gamma_{R,TX}$". The SINR "$T_{R,TX}$" may be said to be one example of the first reference value. The determination in S10 may therefore be said to be a determination about whether the signal-to-interference noise power ratio (SINR) given when the relay station 3 relay-transmits the transmission wave to be transmitted by the terminal station 4 as the first communication station (transmission station) satisfies the first reference value "$T_{R,TX}$".

Effects of Embodiment

In S10, it is determined whether the transmission wave to be transmitted from the terminal station 4 as the first communication station (transmission station) and relay-transmitted by the relay station 3 fulfills the first condition with respect to the signal-to-interference noise power ratio (SINR). In S6, it is determined whether the relay wave, which is relayed by the relay station 3 and reaches the base station 2 as the second communication station (reception station), fulfills the second condition with respect to the transmission power and the signal-to-interference noise power ratio (SINR). When the first condition and the second condition are fulfilled, the relay station 3 transmits the relay wave with the relay power "$P_{R,TX}$" to such a limit as to fulfill the second condition. Accordingly, the communication system 100 suppresses the transmission power (relay power value) of the relay signal down to a range of the necessary limit as illustrated by G3 in FIG. 4, and is thereby enabled to reduce the noise level.

As stated above, the determination in S10 is also a determination about whether the desired SINR "$\Gamma_{R,TX}$" defined as the first reference value is satisfied by the signal-to-interference noise power ratio (SINR) given when the relay station 3 relay-transmits the transmission wave to be transmitted by the terminal station 4 as the first communication station (transmission station). Hence, the determination made as such enables the relay station 3 to determine whether the transmission wave from the relay target terminal station 4 is fundamentally suited to the non-regenerative relay.

As described above, the determination in S6 is a determination in such a case that the second reference value is satisfied by the signal-to-interference noise power ratio (SINR) when the base station 2 as the second communication station receives the relay wave to be relay-transmitted by the relay station 3. Herein, the control apparatus 1 determines whether the relay power value for transmitting the relay wave, given when the second reference value is satisfied by the signal-to-interference noise power ratio (SINR) at the time of receiving the relay wave by the base station 2, falls within the range of being equal to or lower than the allowable transmission power "$P_{R,MAX}$" in the relay station 3. The control apparatus 1 of the communication system 100 is therefore enabled to suppress the transmission power of the relay wave in the relay station 3 while keeping the SINR of the reception signal to the SINR desired in the MCS of the communications or in the range of adding the margin to the desired SINR in the base station 2. Hence, the communication system 100 is enabled to reduce the noises and the level of the interference signal as a result of suppressing the transmission power (i.e., the relay power value) of the relay signal down to the range of the necessary limit as illustrated by G3 in FIG. 4.

Second Embodiment

The communication system 100 according to a second embodiment will hereinafter be described with reference to FIGS. 8 and 9. According to the first embodiment, when determining in S10 that the measurement value "$\gamma_{R,TX}$" of the SINR given when the relay station 3 relay-transmits the transmission wave is smaller than the desired SINR "$\Gamma_{R,TX}$" by way of one example of the first reference value, the relay station 3 finishes processing in the wireless frame. In place of the process as such, however, the control apparatus 1 may instruct the terminal station 4 to increase the transmission power in the range of being equal to or lower than allowable transmission power "$P_{UE,MAX}$" in the terminal station 4. Processes and a configuration in the second embodiment are the same as those in the first embodiment, except a process to be executed when the measurement value "$\gamma_{R,TX}$" of the SINR of the transmission signal to be non-regenerative-relayed is smaller than the desired SINR "$\Gamma_{R,TX}$" in the determination in S10 (NO in S10). Such being the case, other than the process executed in the case of NO in the determination in S10, the processes and the configuration in the first embodiment are to be applied intact to the second embodiment, and hence the descriptions thereof are omitted.

Figure 8:
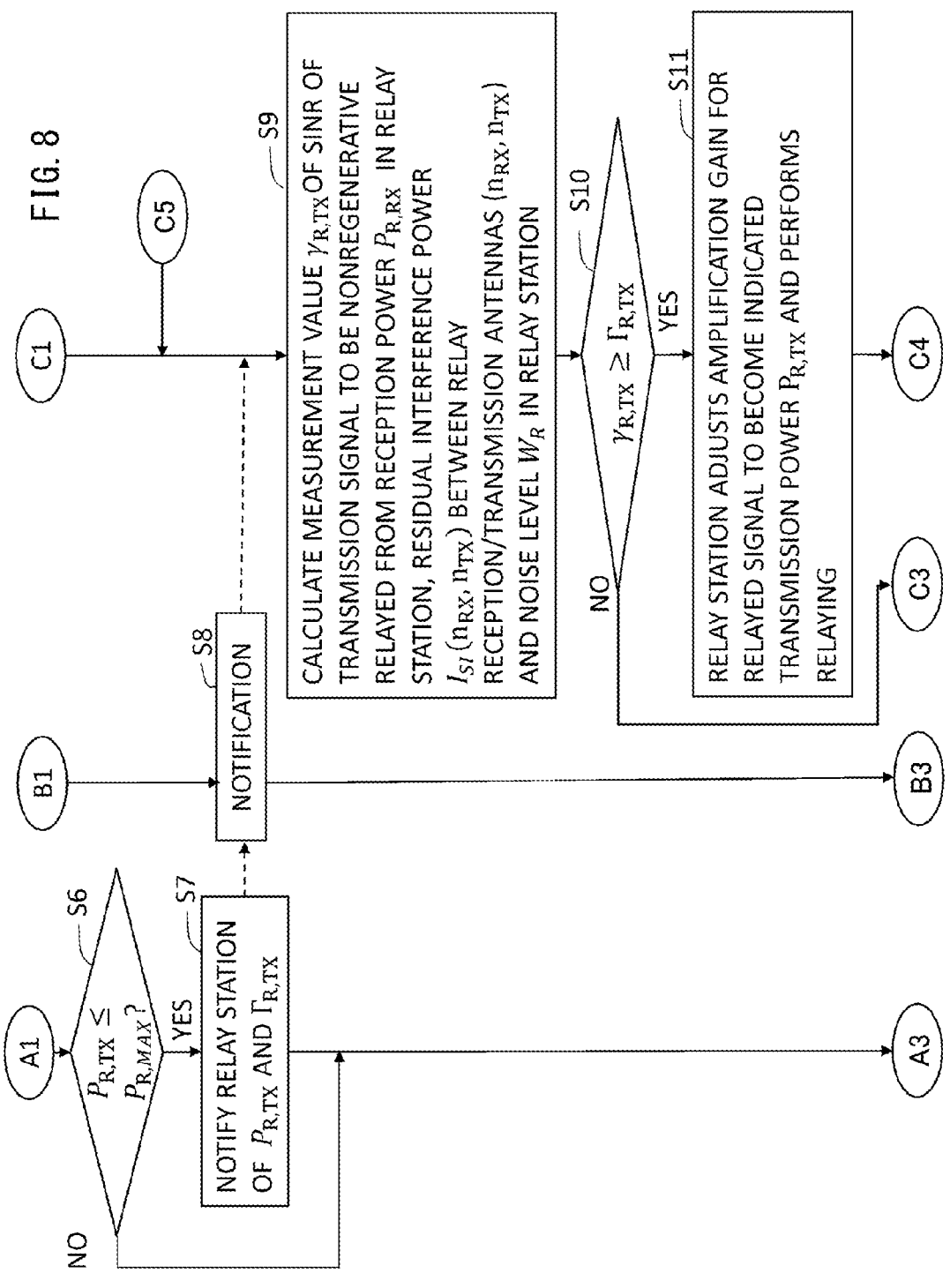
FIG. 8 is a flowchart illustrating a processing flow in the communication system according to a second embodiment.
Figure 9:
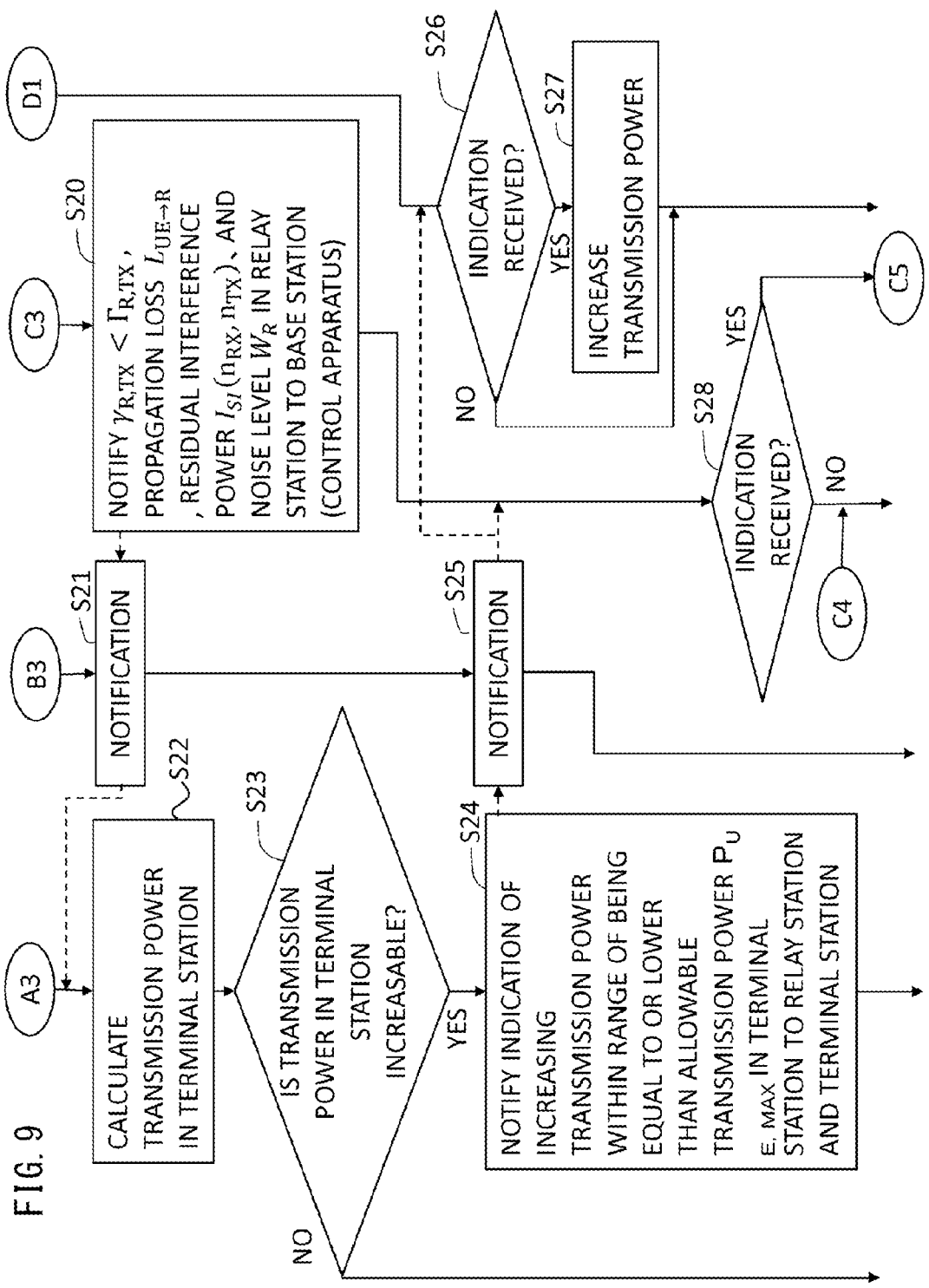
FIG. 9 is a flowchart illustrating the processing flow in the communication system according to the second embodiment.

FIGS. 8 and 9 are flowcharts illustrating the processing flow in the communication system 100 according to the second embodiment. Note that A1 through C1 in FIG. 8 are continued from A1 through C1 in FIG. 6 according to the first embodiment. The symbols A3 through C3 and C4 in FIG. 8 are continued to FIG. 9. On the other hand, C5 in FIG. 8 is continued back from a process (S28) in FIG. 9. In FIG. 8, processes in S6 through S11 are the same as the processes in S6 through S11 in FIG. 7 according to the first embodiment, and hence the descriptions thereof are omitted. After a process in S11, the relay station 3 finishes processing at the connected symbol "C4" in FIG. 9.

However, in F10 of FIG. 8, when the measurement value "$\gamma_{R,TX}$" of the SINR of the transmission signal to be non-regenerative-relayed is less than the desired SINR "$\Gamma_{R,TX}$" given by way of one example of the first reference value (NO in S10), the relay station 3 continues the control to C3 in FIG. 9. The relay station 3 notifies the control apparatus 1 that the measurement value "$\gamma_{R,TX}$" is less "$\Gamma_{R,TX}$" (S20, S21). This notification contains the propagation loss "$L_{UE \to R}$" on the path leading to the relay station 3 from the terminal station 4, the residual interference power "$I_{SI(nRX, nTX)}$" between the relay reception/transmission antennas "$n_{RX}$, $n_{TX}$", and the noise level "$W_R$" in the relay station 3 (S20, S21). Note that the relay station 3 measures the propagation loss "$L_{UE \to R}$" from the reference signal transmitted from the terminal station 4. Information notified in S20 and S21 may be said to be one example of non-fulfillment notification.

The control apparatus 1 calculates the transmission power "$P_{UE, TX}$" of the terminal station 4 in accordance with (Formula 4) given below so that the measurement value "$\gamma_{R,TX}$" of the SINR of the transmission signal to be non-regenerative-relayed becomes equal to or larger than the desired SINR "$\Gamma_{R,TX}$" (S22).

(Mathematical Equation 2)

$$P_{UE,TX} = \Gamma_{R,TX} + L_{UE \to R} + 10 \log_{10} \left( 10^{\frac{I_{SI}(n_{RX}, n_{TX})}{10}} + 10^{\frac{W_R}{10}} \right) \quad \text{(Formula 4)}$$

Added to desired SINR "$\Gamma_{R,TX}$" in (Formula 4) are the propagation loss "$L_{UE \to R}$" of the path leading to the relay station 3 from the terminal station 4, the residual interference power "$I_{SI(nRX,nTX)}$" between the relay reception/transmission antennas "$n_{RX}$, $n_{TX}$", and the noise level "$W_R$" in the relay station 3. Accordingly, (Formula 4) indicates that the measurement value "$\gamma_{R,TX}$" of the SINR of the transmission signal to be non-regenerative-relayed in the relay station 3 becomes equal to or larger than the desired SINR "$\Gamma_{R,TX}$" even by subtracting these values from the transmission power "$P_{UE, TX}$" (division is used for ratio). Note that the residual interference power "$I_{SI(nRX,nTX)}$" will be simply referred to as "$I_{SI}$" in the second and subsequent embodiments as the case may be.

It is then determined whether the transmission power "$P_{UE, TX}$" in the terminal station 4 is increasable in the range of being equal to smaller than the allowable transmission power "$P_{UE,MAX}$" in the terminal station 4 (S23). The transmission power "$P_{UE, TX}$" in the terminal station 4 is settable to increase in the range of being equal to smaller than the allowable transmission power "$P_{UE,MAX}$", and the measurement value "$\gamma_{R,TX}$" of the SINR in the relay station 3 is also settable to become equal to or larger than the desired SINR "$\Gamma_{R,TX}$" (YES in S23), in which case the control apparatus 1 moves forward to S24. In other words, the control apparatus 1 instructs the terminal station 4 and the relay station 3 to increase the transmission power "$P_{UE, TX}$" (S24, S25).

Upon receiving the instruction (YES in S26), the terminal station 4 increases the transmission power "$P_{UE, TX}$" up to a target value (S27). The relay station 3, upon receiving the instruction (YES in S28), loops the processing back to S9 in FIG. 8 as connected by C5, and continues the control.

As described above, according to the second embodiment, when the measurement value "$\gamma_{R,TX}$" of the signal-to-interference noise power ratio (SINR) of the relay signal received from the terminal station 4 and relay-transmitted does not satisfy the first reference value (equal to or larger than "$\Gamma_{R,TX}$"), the relay station 3 sends the non-fulfillment notification to the control apparatus 1. When receiving the non-fulfillment notification, the control apparatus 1 instructs the terminal station 4 to increase the transmission power "$P_{UE, TX}$" of the transmission wave in the range of the allowable transmission power "$P_{UE,MAX}$" in the terminal station 4. Herein, the terminal station 4 is the transmission station and is one example of the first communication station. Therefore, the communication system 100 according to the second embodiment executes the process corresponding to the case in which the measurement value "$\gamma_{R,TX}$" of the SINR of the relay signal to be non-regenerative-relayed is determined to be less than the SINR "$\Gamma_{R,TX}$" desired in the MCS of the communications. To be specific, the communication system 100 controls the transmission power in the terminal station 4 as the first communication station within the allowable range, and is thereby enabled to improve the measurement value "$\gamma_{R,TX}$" of the SINR of the relay signal to be non-regenerative-relayed. In other words, the communication system 100 according to the second embodiment is enabled to enhance the feasibility of performing the non-regenerative relay.

Third Embodiment

In the first embodiment, the control apparatus 1 determines whether the measurement value "$\gamma_{R,TX}$" of the SINR of the relay signal to be non-regenerative-relayed by the relay station 3 is equal to or larger than the desired SINR "$\Gamma_{R,TX}$" (S10 in FIG. 7) without indicating the transmission power to the terminal station 4 as the first communication station (transmission station). In the second embodiment, the control apparatus 1 adjusts the transmission power in the terminal station 4 when the measurement value "$\gamma_{R,TX}$" of the SINR of the relay signal to be non-regenerative-relayed is less than "$\Gamma_{R,TX}$" (NO in S10 of FIG. 8). However, the control apparatus 1 may adjust the transmission power in the terminal station 4 from the beginning and may thus control so that the measurement value "$\gamma_{R,TX}$" of the SINR of the relay signal to be non-regenerative-relayed becomes equal to or larger than the desired SINR "$\Gamma_{R,TX}$". In the third embodiment, other than the process in which the control apparatus 1 adjusts the transmission power in the terminal station 4 from the beginning, processes and a configuration are the same as those in the first and second embodiments. Such being the case, other than the process characteristic of the third embodiment as such, the processes and the configurations in the first and second embodiments are to be applied intact to the third embodiment, and hence the descriptions thereof are omitted.

Control of Signal Power

Figure 10:
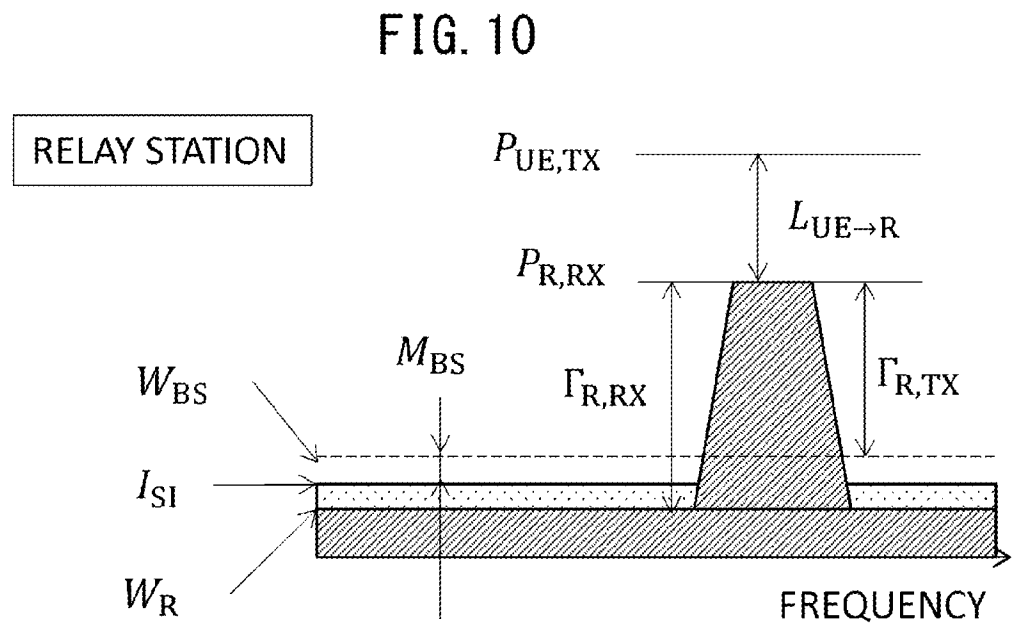

FIG. 10 is a diagram illustrating a profile of the reception signal power in the base station 2 as the second communication station (reception station) when the communication system according to the third embodiment controls the transmission signal power in the relay station 3. A waveform in FIG. 10 is the profile of the reception signal power in the relay station 3. In FIG. 10, the axis of abscissa indicates the frequency. Herein, communication procedures in the relay station 3 are described based on the signal power.

The relay station 3 notifies the control apparatus 1 of the noise level "$W_R$" in the relay station 3, the residual interference power "$I_{SI}$" and the measurement value of the propagation loss "$L_{UE \to R}$" between the terminal station 4 and the relay station 3. The control apparatus 1 calculates, based on the notified items of information, the transmission power "$P_{R,TX}$" in the relay station 3 and the transmission power "$P_{UE, TX}$" in the terminal station 4 (FIG. 10). To be specific, the control apparatus 1 calculates the "$P_{R,TX}$" and "$P_{UE,TX}$" from the noise level "$W_{BS}$" in the base station 2, the desired SINR "$\Gamma_{BS,RX}$" of the non-regenerative relay signal, parameters ("$W_R$", "$I_{SI}$" and "$L_{UE \to R}$") and the propagation loss "$L_{R \to BS}$". Note that the propagation loss "$L_{R \to BS}$" is measured by employing the reference signal used for the notification. Herein, "$\Gamma_{BS,RX}$" is, e.g., the desired SINR of the MCS used in the communications or the desired SINR to which the margin is added.

The transmission power "$P_{R,TX}$" in the relay station 3 is given in (Formula 1) according to the first embodiment and is as illustrated in FIG. 5. The transmission power "$P_{UE,TX}$" in the terminal station 4 is given in (Formula 5) described below. Herein, the second line of (Formula 5) is the same as that of (Formula 4).

(Mathematical Equation 3)

(Formula 5)

$$P_{UE,TX} =$$
$$P_{R,RX} + L_{UE \to R} = \Gamma_{R,TX} + 10\log_{10}\left(10^{\frac{W_R}{10}} + 10^{\frac{I_{SI}}{10}}\right) + L_{UE \to R} =$$
$$\Gamma_{BS,RX} + M_{BS} + 10\log_{10}\left(10^{\frac{W_R}{10}} + 10^{\frac{I_{SI}(n_{RX}, n_{TX})}{10}}\right) + L_{UE \to R}$$

FIG. 10 illustrates relationships between respective values in (Formula 5). Specifically, the transmission power "$P_{UE, TX}$" in the terminal station 4 is a value obtained by adding the measurement value of the propagation loss "$L_{UE \to R}$" between the terminal station 4 and the relay station 3 to the desired reception power "$P_{R,RX}$" in the relay station 3. The desired reception power "$P_{R,RX}$" is a value obtained by adding the noise level "$W_R$" in the relay station 3 and the residual interference power "$I_{SI}$" to the value given by adding the margin to the SINR "$\Gamma_{R,TX}$" desired in the MCS in the communications in the relay station 3 or the value given by adding the margin to the desired SINR.

Substitution of "$\Gamma_{R,TX} = \Gamma_{BS,RX} + M_{BS}$" from (Formula 2) results in becoming the last line (third line) (Formula 5) described above.

Namely, "$P_{UE,TX}$" may be said to be the transmission power in the terminal station 4 for fulfilling the condition that the SINR of the reception signal becomes equal to or larger than the SINR "$\Gamma_{BS,RX}$" desired in the MCS of the communications or the value obtained by adding the margin to the desired SINR in the base station 2.

The control apparatus 1 determines whether the transmission power "$P_{R,TX}$" is equal to or lower than the allowable transmission power "$P_{R,MAX}$" in the relay station 3 and whether the transmission power "$P_{UE,TX}$" is equal to or lower than the allowable transmission power "$P_{UE,MAX}$" in the terminal station 4. When both of the two conditions are fulfilled, the control apparatus 1 notifies "$P_{R,TX}$" to the relay station 3. The control apparatus 1 notifies "$P_{UE,TX}$" to the terminal station 4. The terminal station 4 transmits the signal with the indicated transmission power, and the relay station 3 adjusts the amplification gain for the relayed signal so as to become the indicated transmission power, and relay-transmits the signal.

Processing Flow

Figure 11:
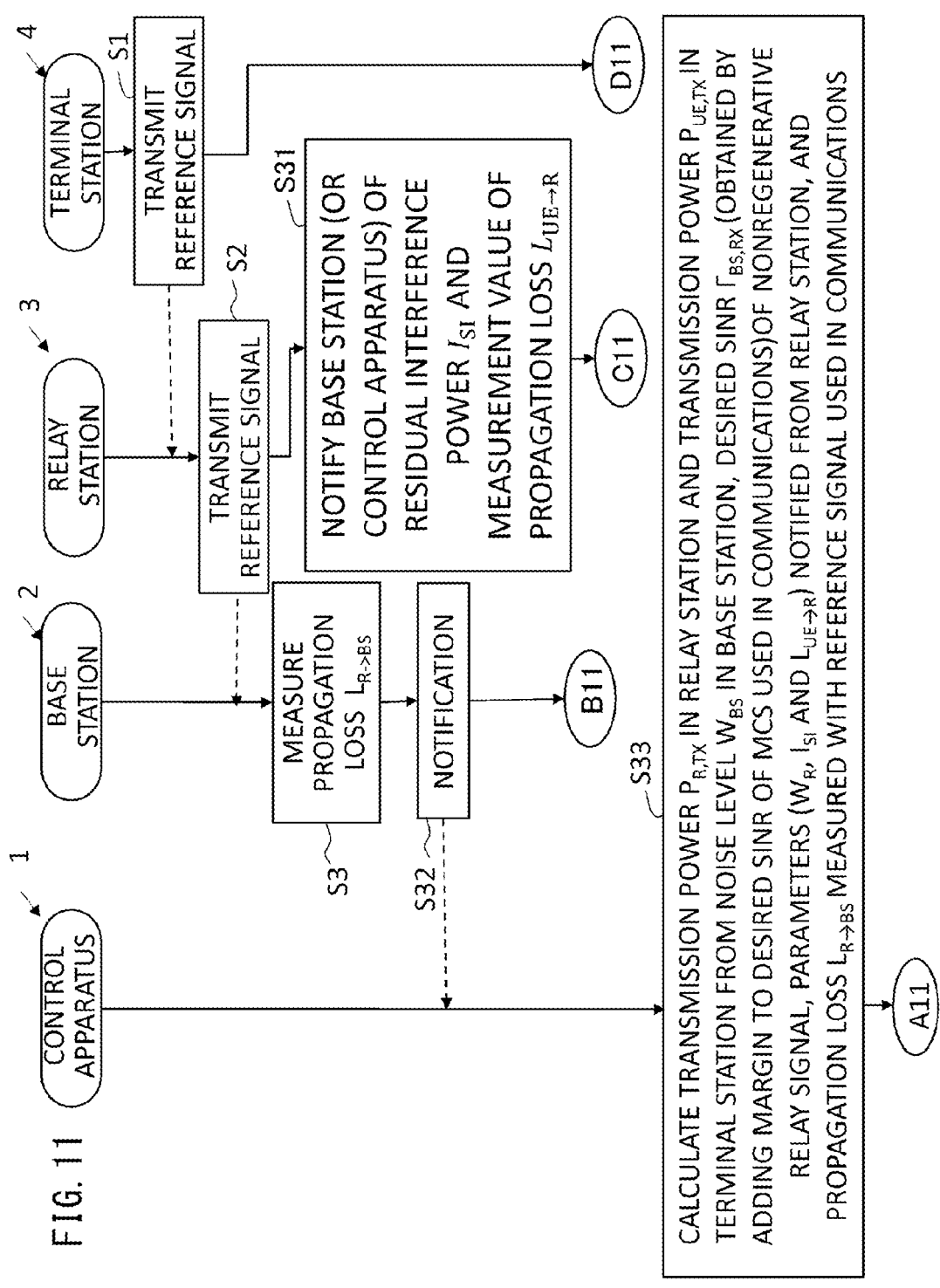
FIG. 11 is a flowchart illustrating a processing flow according to the third embodiment.
Figure 12:
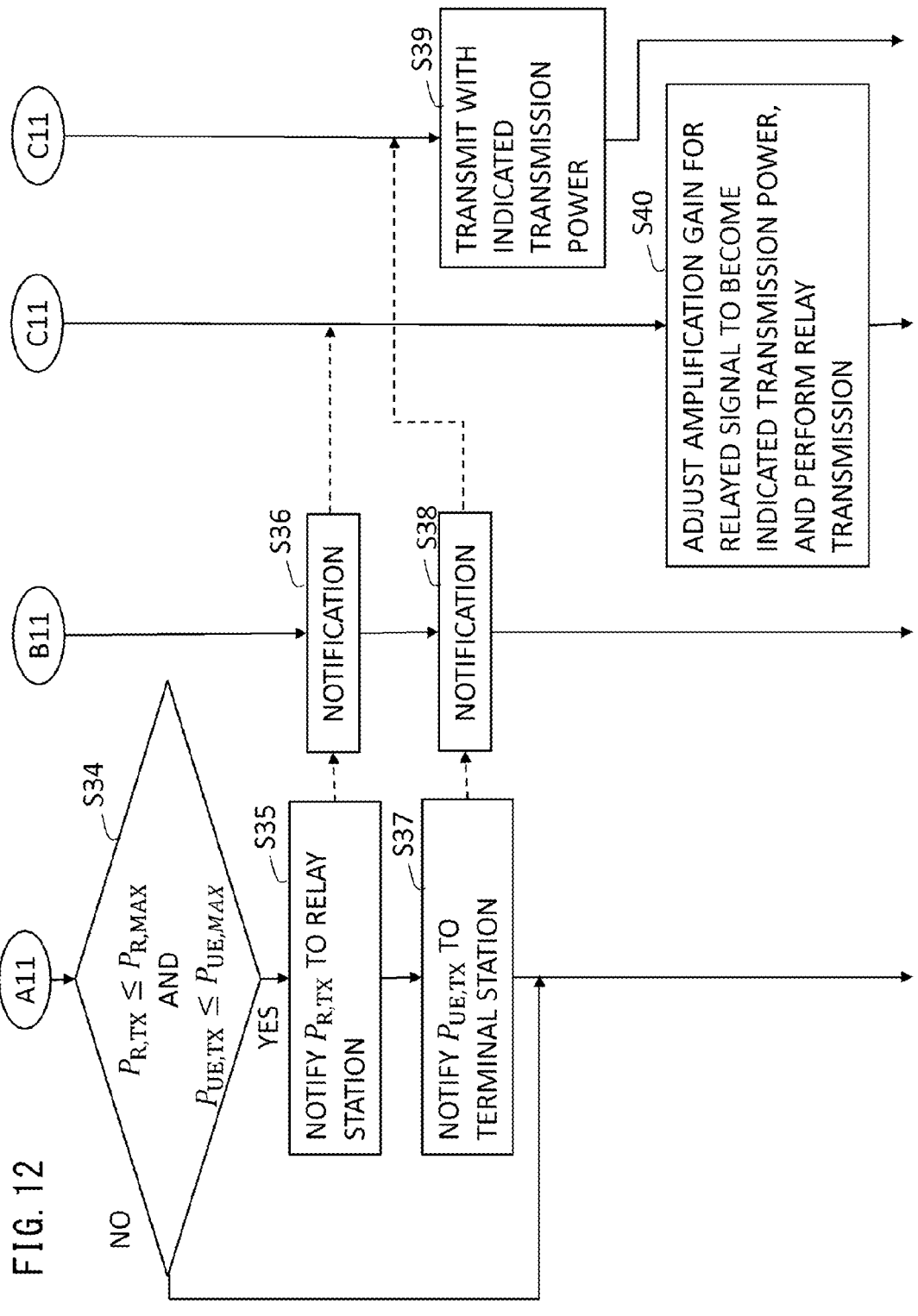
FIG. 12 is a flowchart illustrating the processing flow according to the third embodiment.

FIGS. 11 and 12 are flowcharts illustrating a processing flow according to the third embodiment. As described above, in the third embodiment, the control apparatus 1 may be included in the control circuit 22 of the base station 2 or the control circuit 22A (of the central base station 2A). Accordingly, in the processes of FIGS. 11 and 12, the processes of the control apparatus 1 and the processes of the base station 2 are depicted in different sequences but may also be integrated into a single sequence. The processing flow in FIGS. 11 and 12 is repeated for every wireless frame. Herein, the processing flow will be described on the assumption that the base station 2 operates as the transmission station (the first communication station), and the terminal station 4 operates as the reception station (the second communication station). Processes in S1 through S3 in FIG. 11 are the same as those in FIG. 6 according to the first embodiment, and hence the descriptions thereof are omitted.

In this process, the relay station 3 notifies the control apparatus 1 of the residual interference power "$I_{SI}$" and the measurement value of the propagation loss "$L_{UE \to R}$" between the terminal station 4 and the relay station 3 (S31, S32). The control apparatus 1 is given the noise level "$W_{BS}$" in the base station 2 and the desired SINR "$T_{BS,RX}$" of the non-regenerative relay signal. However, the control apparatus 1 may measure the noise level "$W_{BS}$". The control apparatus 1 receives the parameters ("$W_{BS}$", "$I_{SI}$", and "$L_{UE \to R}$") notified from the relay station 3. The control apparatus 1 measures the propagation loss "$L_{R \to BS}$" by employing the reference signal used for the notification. The control apparatus 1 calculates the transmission power "$P_{R,TX}$" in the relay station 3 and the transmission power "$P_{UE,TX}$" in the terminal station 4 from "$W_{BS}$", "$T_{BS,RX}$", "$I_{SI}$", and "$L_{UE \to R}$" (S33). Note that the desired SINR "$T_{BS,RX}$" is, e.g., a value given by adding the margin to the desired SINR of the MCS used in the communications. FIG. 11 continues at A11 through D11 to FIG. 12. The description will hereinafter be made with reference to FIG. 12.

The control apparatus 1 determines whether the transmission power "$P_{R,TX}$" is equal to or lower than the allowable transmission power "$P_{R,MAX}$" in the relay station 3 and whether the transmission power "$P_{UE,TX}$" is equal to or lower than the allowable transmission power "$P_{UE,MAX}$" in the terminal station 4 (S34).

Herein, as in (Formula 5), "$P_{UE,TX}$" is the transmission power in the terminal station 4 in order to fulfill the condition that the SINR of the transmission signal is the SINR "$T_{BS,RX}$" desired in the MCS of the communications or equal to or larger than a value given by adding the margin to the desired SINR in the base station 2. Similarly to the first embodiment, "$P_{UE,TX}$" is the transmission power in the terminal station 4 in order to fulfill the condition that the SINR of the transmission signal is equal to or larger than a value given by adding the margin to the desired SINR "$T_{R,TX}$" in the relay station 3. The determination of whether the transmission power "$P_{UE,TX}$" is equal to or lower than the allowable transmission power "$P_{UE,MAX}$" is therefore a determination about the reception signal when the transmission wave to be transmitted by the first communication station is relay-transmitted by the relay station 3 and received by the second communication station. In other words, this determination is a determination about the transmission power in the terminal station 4 operating as the first communication station in the case where the signal-to-interference noise power ratio (SINR) given when the second communication station receives the transmission wave satisfies the second reference value ("$T_{BS,RX}$" or the value given by adding the margin to "$T_{BS,RX}$"). This determination may therefore be said to be a determination about the condition (first condition) that the transmission wave is transmitted in such a range that the transmission power value "$P_{UE,TX}$" of the transmission wave from the first communication station is equal to or smaller than the allowable transmission power "$P_{UE,MAX}$" in the first communication station when the second reference value is satisfied.

Similarly to the first embodiment, the transmission power "$P_{R,TX}$" is the transmission power in the relay station 3 in order to obtain the desired SINR "$T_{BS,RX}$" of the non-regenerative relay signal. The determination of whether the transmission power "$P_{R,TX}$" in S34 is equal to or lower than the allowable transmission power "$P_{R,MAX}$" is therefore a determination about the reception signal when the relay wave to be relay-transmitted by the relay station 3 is received by the base station 2 operating as the second communication station (reception station). Namely, this determination is a determination about the relay power value in the relay station 3 when the signal-to-interference noise power ratio (SINR) given upon receiving the relay wave by the base station 2 satisfies the second reference value. In other words, this determination may be said to be a determination about the condition (second condition) that the relay wave is relay-transmitted in such a range that the relay power value "$P_{R,TX}$" for relay-transmitting the relay wave is equal to lower than the allowable transmission power "$P_{R,MAX}$" in the relay station 3 when this reference value is satisfied. When determined NO in S34, the control apparatus 1 finishes processing.

Whereas when determined YES in S34, the control apparatus 1 notifies the indication of the transmission power "$P_{R,TX}$" to the relay station 3 (S35, S36). In this case, the control apparatus 1 further notifies the indication of the transmission power "$P_{UE,TX}$" to the terminal station 4 (S37, S38).

The terminal station 4 transmits the transmission wave with the indicated transmission power "$P_{UE,TX}$" (S39). The relay station 3 adjusts the amplification gain for the relayed signal to become the indicated transmission power "$P_{R,TX}$", and thus performs the relay-transmission (S40).

As described above, according to the third embodiment, it is feasible to set the SINR of the transmission signal to the SINR "$T_{R,TX}$" desired in the MCS of the communications or equal to or larger than the value given by adding the margin to the desired SINR in the relay station 3 within the range of "$P_{UE,TX}$" being equal to or lower than "$P_{UE,MAX}$". It is also feasible to set so that the SINR of the reception signal when received by the base station 2 operating as the second communication station (Reception station) is equal to or larger than the SINR "$T_{BS,RX}$" desired in the MCS of the communications within the range of "$P_{R,TX}$" being equal to or lower than "$P_{R,MAX}$". According to the third embodiment, the SINR of the reception signal, when the transmission wave to be transmitted by the terminal station 4 operating as the first communication station is relay-transmitted by the relay station 3 and received by the second communication station, is controlled within the range of "$P_{UE,TX}$" being equal to or lower than "$P_{UE,MAX}$". In other words, it is feasible to set the SINR of the reception signal to the SINR "$\Gamma_{BS,RX}$" desired in the MCS of the communications or equal to or larger than the value given by adding the margin to the desired SINR. Accordingly, similarly to the first embodiment, it is possible to reduce the noise level and the interference signal level as a result of suppressing the transmission power of the relay signal down to the range of the necessary limit.

Fourth Embodiment

Processes of the communication system 100 according to a fourth embodiment will hereinafter be described with reference to FIG. 13. In the first through third embodiments, the control apparatus 1 determines the transmission power of the relay wave to be transmitted by the relay station 3. However, the control apparatus 1 (or the base station 2) notifies the relay station 3 of the noise level in the base station 2 and the MCS of the communications to be non-regenerative-relayed, whereby the relay station 3 itself may determine the transmission power "$P_{R,TX}$" from the propagation loss between the base station 2 and the relay station 3. Other than the process in which the relay station 3 itself determines the transmission power "$P_{R,TX}$", processes and a configuration in the fourth embodiment are the same as those in the first through third embodiments. Such being the case, other than the process characteristic of the fourth embodiment as such, the processes and the configurations in the first through third embodiments are to be applied intact to the fourth embodiment, and hence the descriptions thereof are omitted.

FIG. 13 is a flowchart illustrating a processing flow of the relay station 3 according to the fourth embodiment. In this process, the relay station 3 receives the noise level "$W_{BS}$" in the base station 2 and the MCS of the communications to be non-regenerative-relayed from the control apparatus 1 (or the base station 2) (S41). Accordingly, the process in S41 is one example of notifying the relay station of information for the control apparatus to determine the first condition and information for the control apparatus to determine the second condition. The noise level "$W_{BS}$" in the base station 2 and the MCS of the communications to be non-regenerative-relayed are one example of information to determine the first condition. The noise level "$W_{BS}$" in the base station 2 and the MCS of the communications to be non-regenerative-relayed are also one example of information to determine the second condition. The relay station 3 calculates the transmission power "$P_{R,TX}$" of the relay wave when the desired SINR "$\Gamma_{BS,RX}$" is obtained in the base station 2 (S42). The relay station 3 executes the process in S42, based on (Formula 1) in the first embodiment.

The relay station 3 determines whether the transmission power "$P_{R,TX}$" is equal to or lower than the allowable transmission power "$P_{R,MAX}$" in the relay station 3 (S43). When the transmission power "$P_{R,TX}$" in the relay station 3 exceeds the allowable transmission power "$P_{R,MAX}$" in the relay station 3 (NO in S43), the relay station 3 finishes processing in the wireless frame. Whereas when the transmission power "$P_{R,TX}$" in the relay station 3 is equal to or lower than the allowable transmission power "$P_{R,MAX}$" in the relay station 3 (YES in S43), the relay station 3 executes processes in S49 through S51. The processes in S49 through S51 are the same as S9 through S11 in FIG. 8 according to the first embodiment. To be specific, the relay station 3 determines whether the signal-to-interference noise power ratio (SINR) given when the relay station 3 relay-transmits the transmission wave satisfies the first reference value ($\Gamma_{R,TX}$) (S50). The relay station 3 determines whether the calculated relay power value of the relay wave falls within the range of the allowable transmission power in the relay station 3 (S43). When determined YES in both S43 and S53, the relay station 3 relay-transmits the relay wave (S51).

The process as such in FIG. 13 may enable the communication system 100 to lessen the interfering influence, on the terminal stations 4-2, 4-3 excluding the terminal station 4-1 undergoing the non-regenerative relay, which may be caused by introducing the non-regenerative relay. In short, the communication system 100 is enabled to improve the throughput of the communication system 100 as a whole.

Other Embodiments

The first through fourth embodiments have been described by exemplifying mainly the uplink. Namely, the descriptions have been made on the assumption that the terminal station 4 operates as the first communication station (transmission station), while the base station 2 operates as the second communication station (reception station). However, it is feasible to carry out the first through fourth embodiments likewise on the downlink.

For instance, the control apparatus 1 controls the downlink, based on a noise level "$W_{UE}$" in the terminal station 4, a desired SINR "$\Gamma_{UE,RX}$" of the non-regenerative relay signal in the terminal station 4, and a propagation loss "$L_{R \to UE}$" measured by use of the reference signal on the control channel, which is transmitted to the terminal station 4 from the relay station 3. In other words, the control apparatus 1 calculates the transmission power "$P_{R,TX}$" in the relay station 3 and an SINR "$\Gamma_{R,TX}$" given when transmitting the relay signal by way of the relay feasibility condition. Herein, the SINR "$\Gamma_{UE,RX}$" is a value obtained by adding the margin to the desired SINR of the communication method (MCS) used in the communications.

The transmission power "$P_{R,TX}$" of the relay wave in the relay station 3 is calculated in (Formula 6) given below.

$$P_{R,TX} = P_{UE,RX} + L_{R \to UE} = W_{UE} + \Gamma_{UE,RX} + L_{R \to UE} \qquad \text{(Formular 6)}$$

where "$W_{UE}$" is the noise level in the terminal station 4 operating as the second communication station (reception station), and "$L_{R \to UE}$" is the propagation loss measured in the terminal station 4 by use of the reference signal on the control channel, which is transmitted from the relay station 3.

The SINR "$\Gamma_{R,TX}$" at the transmission time in the relay station 3 is calculated in (Formula 7) described below.

$$\Gamma_{UE,RX} = \Gamma_{R,TX} - M_{UE} \qquad \text{(Formula 7)}$$

where "$M_{UE}$" is a difference value of the noise level "$W_{UE}$" in the terminal station 4 from the noise level "$W_R$" in the relay station 3. Namely, this formula is established: $W_{UE} = W_R + M_{UE}$. Hence, (Formula 7) indicates that it is possible to approximately calculate the desired SINR "$\Gamma_{R,TX}$" given when transmitting the relay signal by adding the difference value "$M_{UE}$" to the desired SINR "$\Gamma_{UE,RX}$" of the non-regenerative relay signal in the terminal station 4.

The control apparatus 1 notifies the relay station 3 of "$P_{R,TX}$" and "$\Gamma_{R,TX}$" when the transmission power "$P_{R,TX}$" of the relay wave in the relay station 3 is equal to or lower than the allowable transmission power "$P_{R,MAX}$" in the relay station 3. The relay station 3 calculates the measurement value "$\gamma_{R,TX}$" of the SINR of the relay signal to be non-regenerative-relayed in (Formula 3) according to the first embodiment. In this case, however, "$P_{R,RX}$" in (Formula 3) is the reception signal power of the signal in the relay station 3, which is transmitted from the base station 2 operating as the first communication station (transmission station). When measurement value "$\gamma_{R,TX}$" is equal to or larger than "$\Gamma_{R,TX}$", the relay station 3 adjusts the amplification gain for the relayed signal to become the transmission power "$P_{R,TX}$" indicated from the control apparatus 1, and may simply perform relaying. As described above, for example, in the processes in FIGS. 6 and 7 according to the first embodiment, the processes of the base station 2 are replaced by the processes of the terminal station 4, in which case it is feasible to reduce the noise level and the interference signal level as a result of suppressing the transmission power of the relay signal down to the range of the necessary limit on the downlink also. The points described so far are the same as those in the second through fourth embodiments.

The embodiments discussed above are nothing but one examples, and the embodiments of the present disclosure may be carried out by being properly varied within the range that does not deviate from the gist thereof. The processes and the means described in the present disclosure are implementable by being combined without any restrictions as far as any technical contradictions are not caused.

The processes described as being executed by one apparatus may also be executed by a plurality of apparatuses by sharing the processes. None of problems may be caused alternatively when the processes described as being performed by the different apparatuses are executed by one apparatus. In a computer system, a method of how respective functions are attained by what type of hardware configuration (server configuration) may be flexibly varied.

The present disclosure is attainable also by supplying the computer with computer programs implementing the functions described in the embodiments and making one or more processors included in the computer read and execute the programs. The computer may be provided with the computer programs functioning as such by using a non-transitory computer readable storage medium connectible to a system bus of the computer, or through the network. The non-transitory computer readable storage medium includes: e.g., an arbitrary type of disc exemplified by a magnetic disc (Floppy disc (registered trademark), a hard disc drive (HDD)), and optical discs (CD-ROM, DVD disc, and Blu-ray disc); and an arbitrary type of medium suited to storing electronic instructions, which medium is exemplified by a Read Only Memory (ROM); a Random Access Memory (RAM), an Erasable Programmable ROM (EPROM), an Electrically Erasable Programmable ROM (EEPROM), a magnetic card, a flash memory, or an optical card.

What is claimed is:

1. A communication system comprising:
a first communication station;
a second communication station;
a relay station to non-regenerative-relay communications between the first communication station and the second communication station; and
a control apparatus,
the relay station relay-transmitting a relay wave with a relay power value of such a limit as to fulfill a second condition when a transmission wave being transmitted from the first communication station and being relay-transmitted by the relay station fulfills a first condition about a signal-to-interference noise power ratio (SINR) and when the relay wave being relay-transmitted by the relay station and reaching the second communication station fulfills the second condition about the signal-to-interference noise power ratio (SINR) and the relay power value in the relay station.

2. The communication system according to claim 1, wherein the first condition is that the signal-to-interference noise power ratio (SINR), given when the transmission wave transmitted by the first communication station is relay-transmitted by the relay station, satisfies a first reference value, and
the second condition is that the relay power value to relay-transmit the relay wave, in a case where the signal-to-interference noise power ratio (SINR) given when the relay wave being relay-transmitted by the relay station is received by the second communication station satisfies a second reference value, is within a range of allowable transmission power in the relay station.

3. The communication system according to claim 2, wherein the control apparatus, when the relay wave fulfills the second condition, notifies the relay station of the relay power value of the relay wave fulfilling the second condition and information for specifying the first reference value, and
the relay station relay-transmits the relay wave with the notified relay power value when the signal-to-interference noise power ratio (SINR) given upon relay-transmitting the transmission wave by the relay station satisfies the first reference value.

4. The communication system according to claim 2, wherein the control apparatus notifies the relay station of information for determining the first condition and information for determining the second condition, and
the relay station: calculates the relay power value to relay-transmit the relay wave when the signal-to-interference noise power ratio (SINR) given upon the second communication station's receiving the relay wave being relay-transmitted by the relay station satisfies the second reference value; and relay-transmits the relay wave when the signal-to-interference noise power ratio (SINR) given upon relay-transmitting the transmission wave by the relay station satisfies the first reference value, and when the calculated relay power value of the relay wave is within the range of the allowable transmission power in the relay station.

5. The communication system according to claim 2, wherein the relay station notifies the control apparatus of non-fulfillment notification when the signal-to-interference noise power ratio (SINR) given upon relay-transmitting the transmission wave by the relay station does not satisfy the first reference value, and
the control apparatus, when receiving the non-fulfillment notification, instructs the first communication station to increase power of the transmission wave within the range of the allowable transmission power in the first communication station.

6. The communication system according to claim 1, wherein the first condition is that a transmission power value of the transmission wave, when the signal-to-interference noise power ratio (SINR) given upon the relay station's relay-transmitting the transmission wave being transmitted by the first communication station satisfies the first reference value, is within the range of the allowable transmission power in the first communication station, and
the second condition is that a relay power value to relay-transmit the relay wave, when the signal-to-interference noise power ratio (SINR) given upon the second communication station's receiving the relay wave being transmitted by the first communication station satisfies the second reference value, is within the range of the allowable transmission power in the relay station.

7. The communication system according to claim 6, wherein the control apparatus, when the transmission wave fulfills the first condition and when the relay wave fulfills the second condition, notifies the first communication station of the transmission power value of the transmission wave fulfilling the first condition, and notifies the relay station of the relay power value of the relay wave fulfilling the second condition, the first communication station transmits the transmission wave with the transmission power value that fulfills the first condition, and the relay station relays the relay wave with the relay power value that fulfills the second condition.

8. The communication system according to claim 1, wherein the first condition is that the transmission wave coming from the first communication station, when the signal-to-interference noise power ratio (SINR) given upon the relay station's relay-transmitting the transmission wave being transmitted by the first communication station and upon the second communication station's receiving the relay-transmitted transmission wave satisfies the second reference value, is transmitted within the range of the allowable transmission power in the first communication station, and the second condition is that the relay power value to relay-transmit the relay wave, when the signal-to-interference noise power ratio (SINR) given upon the second communication station's receiving the relay power value of the relay wave being relay-transmitted by the relay station satisfies the second reference value, is within the range of the allowable transmission power in the relay station.

9. A control apparatus configured to:

control a first communication station, a second communication station, and a relay station to non-regenerative-relay communications between the first communication station and the second communication station; and cause the relay station to relay-transmit a relay wave with a relay power value of such a limit as to fulfill a second condition when a transmission wave being transmitted from the first communication station and being relay-transmitted by the relay station fulfills a first condition about a signal-to-interference noise power ratio (SINR) and when the relay wave being relay-transmitted by the relay station and reaching the second communication station fulfills the second condition about the signal-to-interference noise power ratio (SINR) and the relay power value in the relay station.

10. The control apparatus according to claim 9, wherein the first condition is that the signal-to-interference noise power ratio (SINR), given when the transmission wave transmitted by the first communication station is relay-transmitted by the relay station, satisfies a first reference value, and the second condition is that the relay power value to relay-transmit the relay wave, in a case where the signal-to-interference noise power ratio (SINR) given when the relay wave being relay-transmitted by the relay station is received by the second communication station satisfies a second reference value, is within a range of allowable transmission power in the relay station.

11. The control apparatus according to claim 10, wherein the control apparatus, when the relay wave fulfills the second condition, notifies the relay station of the relay power value of the relay wave fulfilling the second condition and information for specifying the first reference value, and the relay station relay-transmits the relay wave with the notified relay power value when the signal-to-interference noise power ratio (SINR) given upon relay-transmitting the transmission wave by the relay station satisfies the first reference value.

12. The control apparatus according to claim 10, wherein the control apparatus notifies the relay station of information for determining the first condition and information for determining the second condition, and the relay station: calculates the relay power value to relay-transmit the relay wave when the signal-to-interference noise power ratio (SINR) given upon the second communication station's receiving the relay wave being relay-transmitted by the relay station satisfies the second reference value; and relay-transmits the relay wave when the signal-to-interference noise power ratio (SINR) given upon relay-transmitting the transmission wave by the relay station satisfies the first reference value, and when the calculated relay power value of the relay wave is within the range of the allowable transmission power in the relay station.

13. The control apparatus according to claim 10, wherein the relay station notifies the control apparatus of non-fulfillment notification when the signal-to-interference noise power ratio (SINR) given upon relay-transmitting the transmission wave by the relay station does not satisfy the first reference value, and the control apparatus, when receiving the non-fulfillment notification, instructs the first communication station to increase power of the transmission wave within the range of the allowable transmission power in the first communication station.

14. The control apparatus according to claim 9, wherein the first condition is that a transmission power value of the transmission wave, when the signal-to-interference noise power ratio (SINR) given upon the relay station's relay-transmitting the transmission wave being transmitted by the first communication station satisfies the first reference value, is within the range of the allowable transmission power in the first communication station, and the second condition is that a relay power value to relay-transmit the relay wave, when the signal-to-interference noise power ratio (SINR) given upon the second communication station's receiving the relay wave being transmitted by the first communication station satisfies the second reference value, is within the range of the allowable transmission power in the relay station.

15. The control apparatus according to claim 14, wherein the control apparatus, when the transmission wave fulfills the first condition and when the relay wave fulfills the second condition, notifies the first communication station of the transmission power value of the transmission wave fulfilling the first condition, and notifies the relay station of the relay power value of the relay wave fulfilling the second condition, the first communication station transmits the transmission wave with the transmission power value that fulfills the first condition, and the relay station relays the relay wave with the relay power value that fulfills the second condition.

16. The control apparatus according to claim 9, wherein the first condition is that the transmission wave coming from the first communication station, when the signal-to-interference noise power ratio (SINR) given upon the relay station's relay-transmitting the transmission wave being transmitted by the first communication station and upon the second communication station's receiving the relay-transmitted transmission wave satisfies the second reference value, is transmitted within the range of the allowable transmission power in the first communication station, and the second condition is that the relay power value to relay-transmit the relay wave, when the signal-to-interference noise power ratio (SINR) given upon the second communication station's receiving the relay power value of the relay wave being relay-transmitted by the relay station satisfies the second reference value, is within the range of the allowable transmission power in the relay station.

17. A relay station comprising:

one or more antennas;

wireless equipment to be connected to the one or more antennas; and a control circuit, the relay station: non-regenerative-relaying communications between a first communication station and a second communication station in accordance with control apparatus; and relay-transmitting a relay wave with a relay power value of such a limit as to fulfill a second condition when a transmission wave being transmitted from the first communication station and being relay-transmitted by the relay station fulfills a first condition about a signal-to-interference noise power ratio (SINR) and when the relay wave being relay-transmitted by the relay station and reaching the second communication station fulfills the second condition about the signal-to-interference noise power ratio (SINR) and the relay power value in the relay station.

18. The relay station according to claim 17, wherein the first condition is that the signal-to-interference noise power ratio (SINR), given when the transmission wave transmitted by the first communication station is relay-transmitted by the relay station, satisfies a first reference value, and the second condition is that the relay power value to relay-transmit the relay wave, in a case where the signal-to-interference noise power ratio (SINR) given when the relay wave being relay-transmitted by the relay station is received by the second communication station satisfies a second reference value, is within a range of allowable transmission power in the relay station.

19. The relay station according to claim 18, wherein the control apparatus, when the relay wave fulfills the second condition, notifies the relay station of the relay power value of the relay wave fulfilling the second condition and information for specifying the first reference value, and the relay station relay-transmits the relay wave with the notified relay power value when the signal-to-interference noise power ratio (SINR) given upon relay-transmitting the transmission wave by the relay station satisfies the first reference value.

20. A communication method of communications among a first communication station, a second communication station, and a relay station to non-regenerative-relay the communications between the first communication station and the second communication station, the method comprising:

causing the relay station to relay-transmit a relay wave with a relay power value of such a limit as to fulfill a second condition when a transmission wave being transmitted from the first communication station and being relay-transmitted by the relay station fulfills a first condition about a signal-to-interference noise power ratio (SINR) and when the relay wave being relayed by the relay station and reaching the second communication station fulfills the second condition about the signal-to-interference noise power ratio (SINR) and the relay power value in the relay station.

* * * * *